(12) United States Patent
Tsuiki et al.

(10) Patent No.: US 9,680,358 B2
(45) Date of Patent: Jun. 13, 2017

(54) METHOD FOR MANUFACTURING A WINDING BODY THAT IS USED IN AN ARMATURE WINDING FOR AN ELECTRIC MACHINE

(71) Applicant: MITSUBISHI ELECTRIC CORPORATION, Chiyoda-ku, Tokyo (JP)

(72) Inventors: Hironori Tsuiki, Tokyo (JP); Hiroyuki Akita, Tokyo (JP); Atsushi Sakaue, Tokyo (JP); Masaya Inoue, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 215 days.

(21) Appl. No.: 14/436,296

(22) PCT Filed: Sep. 6, 2013

(86) PCT No.: PCT/JP2013/074125
§ 371 (c)(1),
(2) Date: Apr. 16, 2015

(87) PCT Pub. No.: WO2014/065026
PCT Pub. Date: May 1, 2014

(65) Prior Publication Data
US 2015/0288262 A1 Oct. 8, 2015

(30) Foreign Application Priority Data
Oct. 22, 2012 (JP) .................. 2012-232679

(51) Int. Cl.
*H02K 15/04* (2006.01)
*H02K 3/12* (2006.01)
*H02K 15/06* (2006.01)

(52) U.S. Cl.
CPC ........... *H02K 15/0421* (2013.01); *H02K 3/12* (2013.01); *H02K 15/045* (2013.01); *H02K 15/066* (2013.01); *Y10T 29/49071* (2015.01)

(58) Field of Classification Search
CPC .. H02K 3/02; H02K 3/04; H02K 3/28; H02K 3/32; H05K 3/12; H05K 15/0421; H05K 15/045; H05K 15/066; Y10T 29/49071
See application file for complete search history.

(56) References Cited

U.S. PATENT DOCUMENTS 6,590,310 B2 * 7/2003 Takano .................. H02K 3/522
29/596
6,897,594 B2 * 5/2005 Ichikawa ................ H02K 3/12
310/180

(Continued)

FOREIGN PATENT DOCUMENTS

JP 51-118001 A 10/1976
JP 51-118001 U 10/1976

(Continued)

OTHER PUBLICATIONS

Office Action issued in corresponding Japanese Patent Application No. 2014-543181, mailed Aug. 4, 2015, with English translation (6 pages).

(Continued)

*Primary Examiner* — Carl Arbes
(74) *Attorney, Agent, or Firm* — Buchanan Ingersoll & Rooney PC

(57) ABSTRACT

A method for manufacturing a winding body includes: a bulging portion forming step in which bulging portions are formed by bending at a set pitch on a conductor wire; a crank portion forming step in which the crank portions are formed by bending on central portions of the bulging portions; an inclined portion and rectilinear portion forming step in which inclined portions and rectilinear portions are formed (Continued)

by bending on the conductor wire on which the bulging portions are formed at a set pitch and on which the crank portions are formed on each of the bulging portions after completion of the bulging portion forming step and the crank portion forming step; and a circular arc portion forming step in which the inclined portions are bent and formed into a circular arc shape.

8 Claims, 23 Drawing Sheets

(56) References Cited

U.S. PATENT DOCUMENTS

| | | |
|---|---|---|
| 2008/0093948 A1 | 4/2008 | Naganawa |
| 2012/0025658 A1 | 2/2012 | Watanabe et al. |
| 2012/0200191 A1 | 8/2012 | Baba et al. |

FOREIGN PATENT DOCUMENTS

| | | |
|---|---|---|
| JP | 62-089454 | 4/1987 |
| JP | 06-284651 A | 10/1994 |
| JP | 2003264964 A | 9/2003 |
| JP | 2004-297863 A | 10/2004 |
| JP | 2008104293 A | 5/2008 |
| JP | 2012-182972 A | 9/2012 |
| WO | 2011/074114 A1 | 6/2011 |

OTHER PUBLICATIONS

Chinese Office Action dated Aug. 19, 2016 issued in corresponding Chinese Patent Appln. No. 201380055090.8, with English translation (11 pages).

International Search Report (PCT/ISA/210) mailed on Dec. 3, 2013, by the Japanese Patent Office as the International Searching Authority for International Application No. PCT/JP2013/074125.

Written Opinion (PCT/ISA/237) mailed on Dec. 3, 2013, by the Japanese Patent Office as the International Searching Authority for International Application No. PCT/JP2013/074125.

\* cited by examiner

METHOD FOR MANUFACTURING A WINDING BODY THAT IS USED IN AN ARMATURE WINDING FOR AN ELECTRIC MACHINE

TECHNICAL FIELD

The present invention relates to a method for manufacturing a winding body that is used in armature windings for electric machines such as rotary electric machines such as electric motors or generators, or direct acting machines such as linear motors.

BACKGROUND ART

In recent years, compactness, high output, and high quality have been required in rotary electric machines such as electric motors or generators. With regard to downsizing rotary electric machines of this kind, armature windings that have concentrated windings in which conductor wires are wound onto individual armature core teeth have been used with a view to downsizing coil ends, which do not generate effective magnetic flux. However, armatures that use armature windings of distributed winding construction that can suppress torque pulsation and increase output are in demand.

Now, in contrast to concentrated windings, which are configured by winding conductor wires onto individual teeth, windings that are configured by winding conductor wires into pairs of slots that are separated by greater than or equal to two slots are designated "distributed windings". In other words, distributed windings are windings that are wound for a plurality of turns such that a conductor wire that extends outward from one slot spans two or more consecutive teeth and enters another slot.

In conventional methods for manufacturing coils such as that described in Patent Literature 1, hexagonal coil wires have been produced by chucking at a set pitch a wire material that has a length that is equivalent to a single turn, operating the respective chucking portions to apply two-dimensional bending to the wire material, and then applying three-dimensional bending to the wire material to which two-dimensional bending has been applied.

CITATION LIST

Patent Literature

Patent Literature 1: Japanese Patent Laid-Open No. HEI 6-284651 (Gazette)

SUMMARY OF THE INVENTION

Problem to be Solved by the Invention

However, in conventional methods for manufacturing coils such as that described in Patent Literature 1, because the two-dimensional bending between coil ends and rectilinear portions in one turn of hexagonal coil wire is performed simultaneously using a single apparatus, one problem has been that a large apparatus is required, increasing equipment costs. Because the machining unit is one turn of hexagonal coil wire, another problem has been that a step of joining a set number of coil wires is separately required to produce distributed windings that have a plurality of turns, also increasing manufacturing costs.

The present invention aims to solve the above problems and an object of the present invention is to provide a method for manufacturing a winding body that is used in an armature winding for an electric machine by which a winding body that is configured by winding a conductor wire into a helical shape for a set number of turns can be manufactured inexpensively using a simple mechanism.

Means for Solving the Problem

In order to achieve the above object, according to one aspect of the present invention, there is provided a method for manufacturing a winding body that is used in an armature winding for an electric machine, the winding body being configured by winding a jointless continuous conductor wire that is coated with insulation into a helical shape for m turns, where m is a natural number that is greater than or equal to two, so as to include: rectilinear portions that are arranged into two columns such that m of the rectilinear portions line up in each of the columns; and coil ends that link together end portions of the rectilinear portions between the columns, each of the coil ends including: a bulging portion; a pair of inclined portions that link the bulging portion and the rectilinear portions; and a crank portion that is formed on a central portion of the bulging portion, and that displaces the rectilinear portions that are linked by the coil end by a set amount in a direction of arrangement of the rectilinear portions, wherein the method for manufacturing a winding body that is used in an armature winding for an electric machine includes: a bulging portion forming step in which the bulging portions are formed by bending at a set pitch on the conductor wire; a crank portion forming step in which the crank portions are formed by bending on the central portions of the bulging portions; a rectilinear portion forming step in which the rectilinear portions are formed by bending on the conductor wire on which the bulging portions are formed at a set pitch and on which the crank portions are formed on each of the bulging portions after completion of the bulging portion forming step and the crank portion forming step; and an inclined portion forming step in which the inclined portions are formed by bending on the conductor wire on two sides of the bulging portions before the rectilinear portion forming step.

Effects of the Invention

According to the present invention, because two-dimensional bending by which the bulging portions and the crank portions are made is performed so as to be divided into a bulging portion forming step and a crank portion forming step, the mechanisms of the apparatus can be simplified, enabling reductions in apparatus size and reductions in cost to be achieved.

Because a conductor wire in which the bulging portions are formed at a set pitch and the crank portions are formed on each of the bulging portions is produced by the bulging portion forming step and the crank portion forming step, winding bodies that have a set number of turns can be produced simply by changing the number of bulging portions formed. Thus, a step in which a set number of coil wires are joined together is no longer required, enabling reductions in manufacturing costs to be achieved.

DESCRIPTION OF EMBODIMENTS

Preferred embodiments of the method for manufacturing an armature winding for an electric machine according to the present invention will now be explained with reference to the drawings.

Embodiment 1

Figure 1:
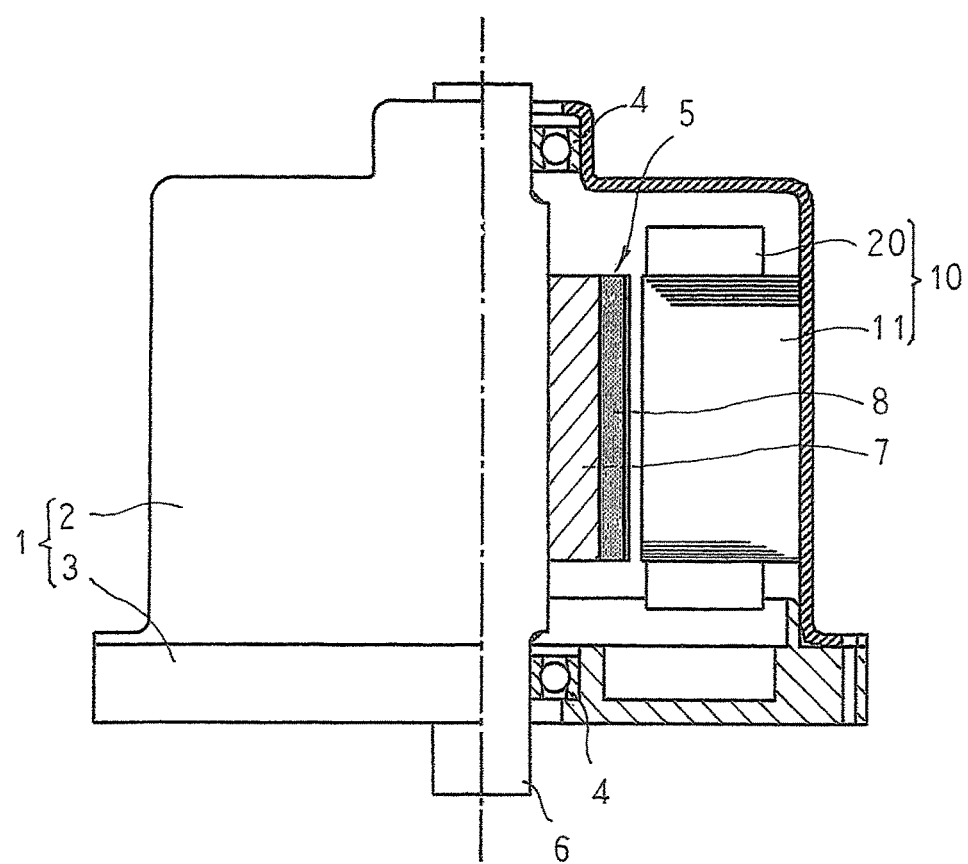
FIG. 1 is a half section that shows a rotary electric machine according to Embodiment 1 of the present invention.
Figure 2:
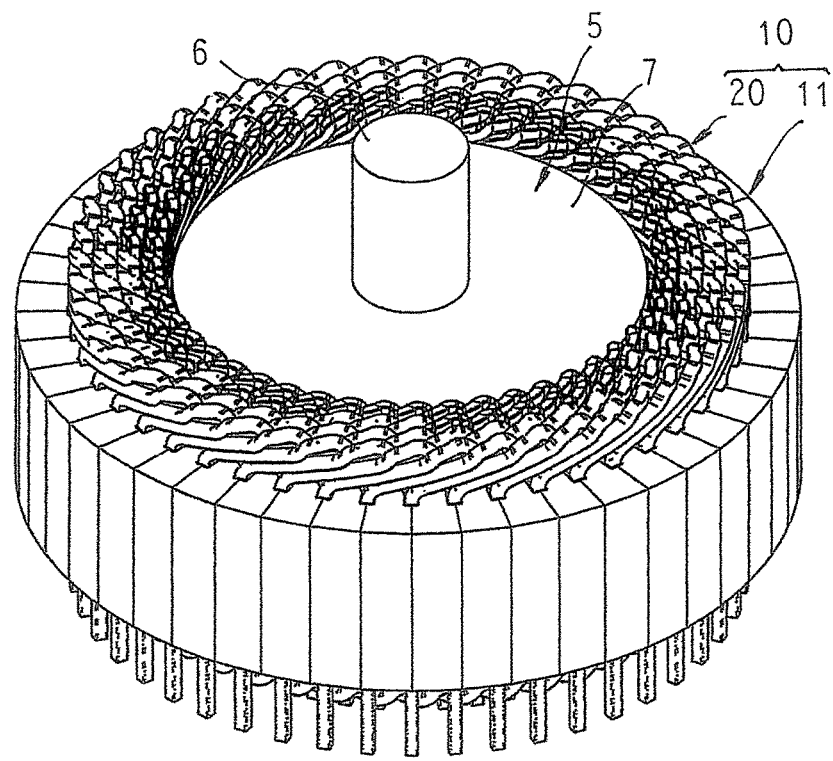
FIG. 2 is an oblique projection that shows part of the rotary electric machine according to Embodiment 1 of the present invention.
Figure 3:
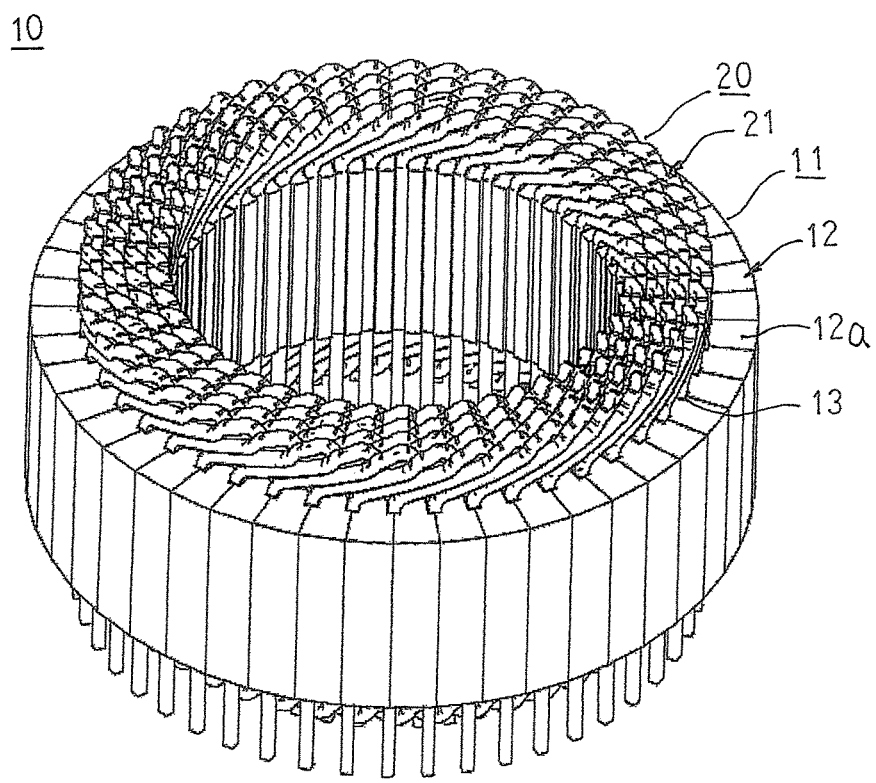
FIG. 3 is an oblique projection that shows a stator that is used in the rotary electric machine according to Embodiment 1 of the present invention.
Figure 4:
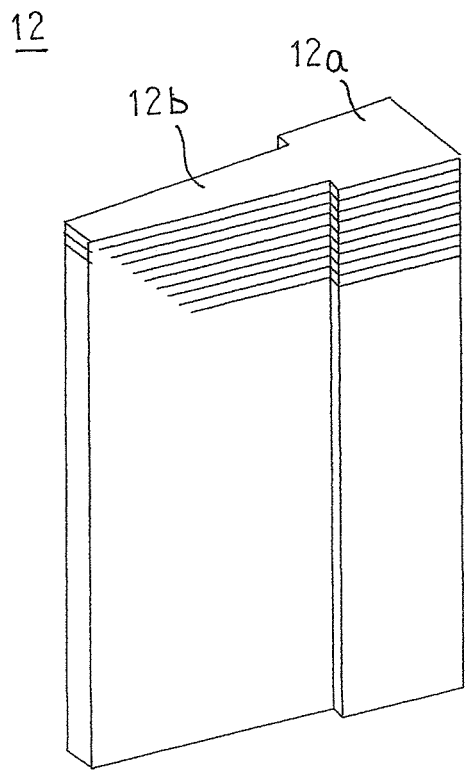
FIG. 4 is an oblique projection that shows a core block that constitutes a stator core that is used in the rotary electric machine according to Embodiment 1 of the present invention.
Figure 5:
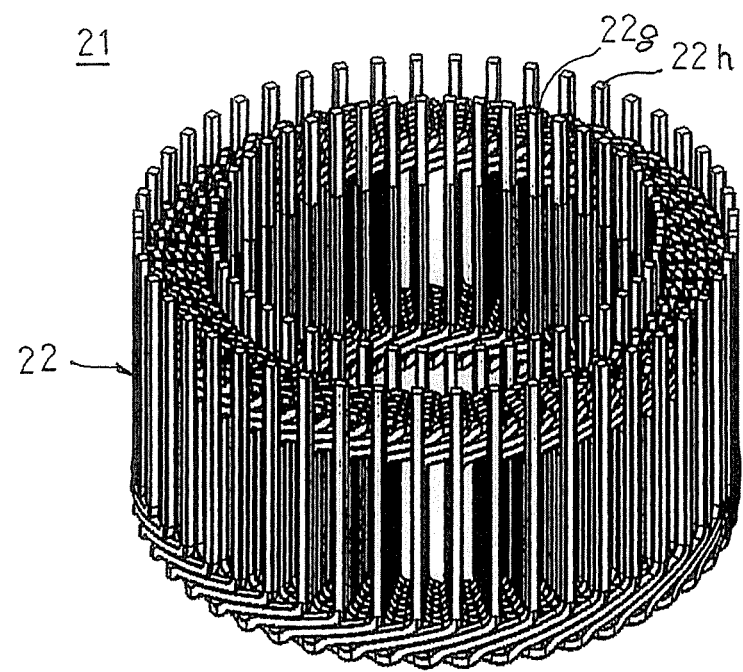
FIG. 5 is an oblique projection that shows a winding assembly that constitutes a stator winding of the stator that is used in the rotary electric machine according to Embodiment 1 of the present invention.
Figure 6:
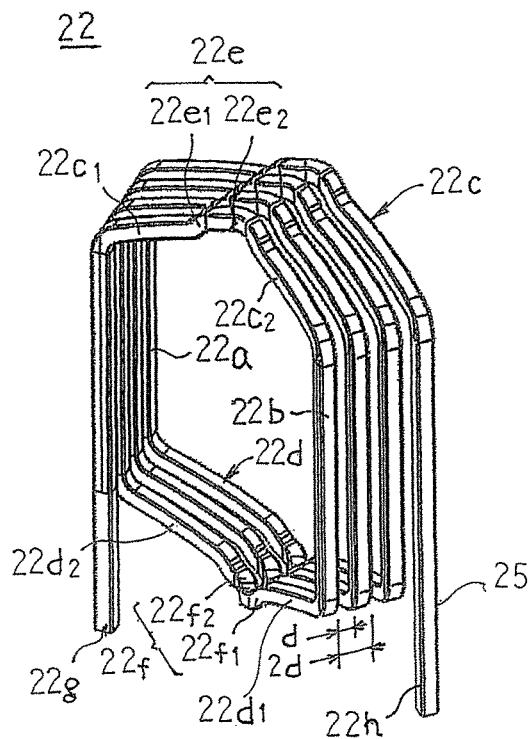
FIG. 6 is an oblique projection that shows a winding body that constitutes the winding assembly in the rotary electric machine according to Embodiment 1 of the present invention.
Figure 7:
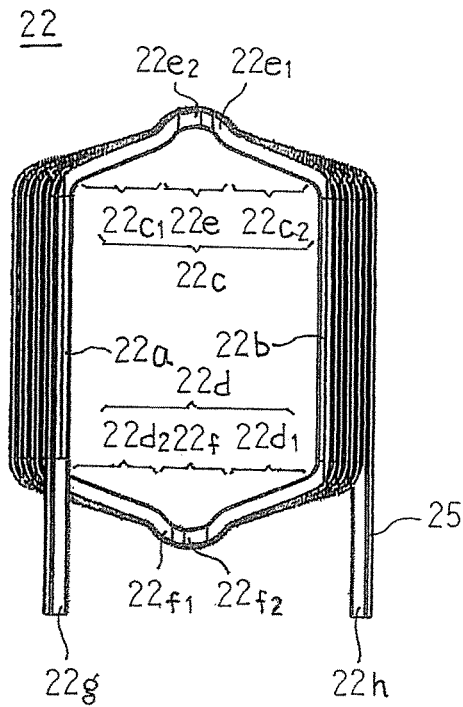
FIG. 7 is a front elevation that shows the winding body that constitutes the winding assembly in the rotary electric machine according to Embodiment 1 of the present invention.
Figure 8:
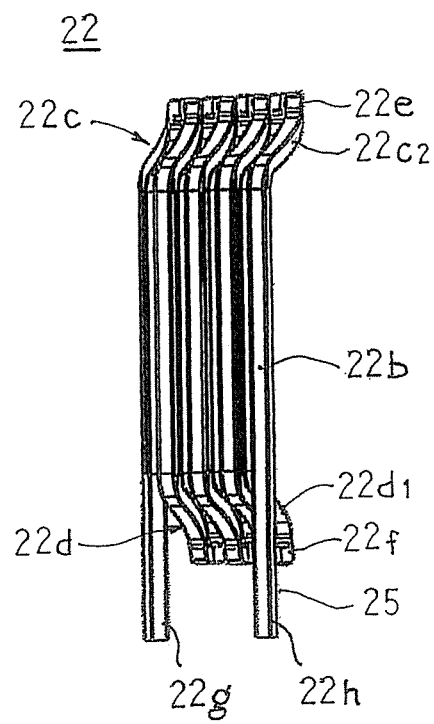
FIG. 8 is a side elevation that shows the winding body that constitutes the winding assembly in the rotary electric machine according to Embodiment 1 of the present invention.
Figure 9:
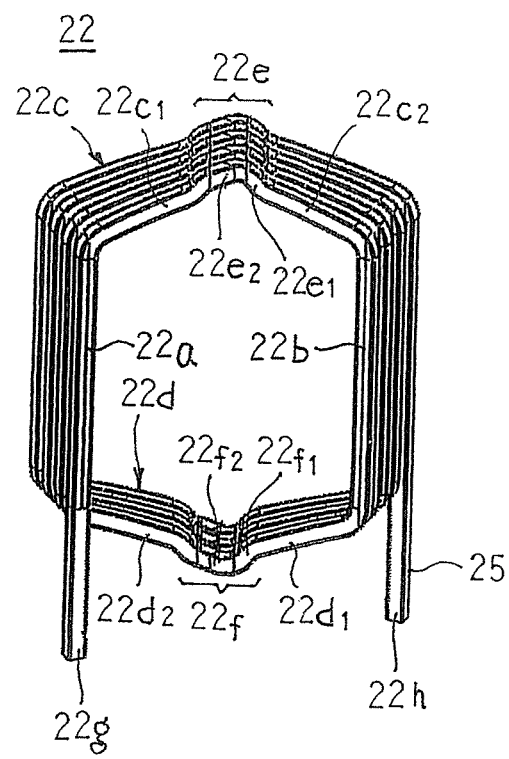
FIG. 9 is an oblique projection of the winding body that constitutes the winding assembly in the rotary electric machine according to Embodiment 1 of the present invention when viewed from obliquely above a front surface.
Figure 10:
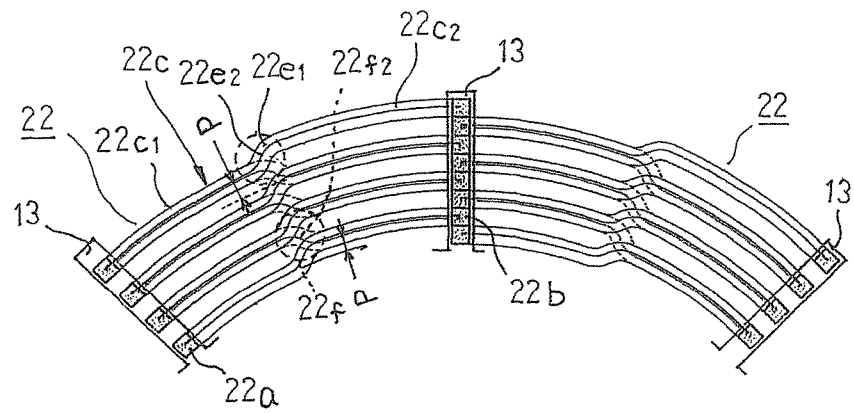
FIG. 10 is a partial end elevation of a state in which two winding bodies in the rotary electric machine according to Embodiment 1 of the present invention are mounted into the stator core so as to share a single slot when viewed from a side near a first axial end.
Figure 11:
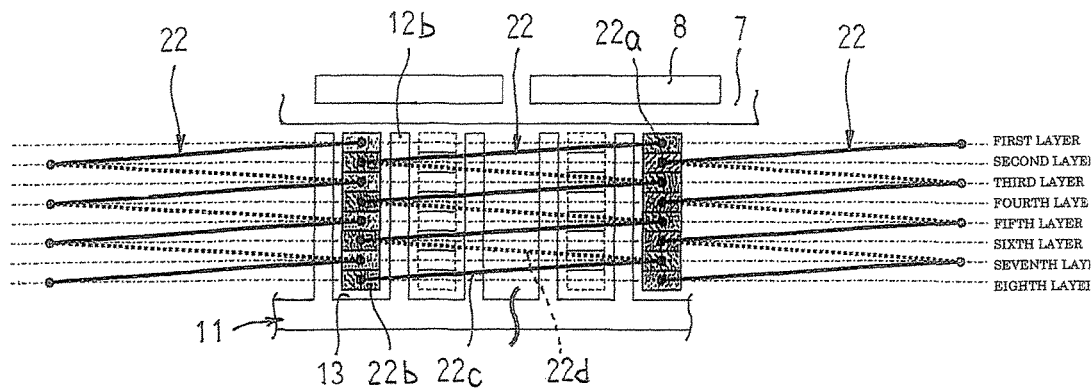
FIG. 11 is a developed projection of a state in which three winding bodies in the rotary electric machine according to Embodiment 1 of the present invention are mounted into identical slot groups of the stator core consecutively in a circumferential direction when viewed from a side near a first axial end.
Figure 12:
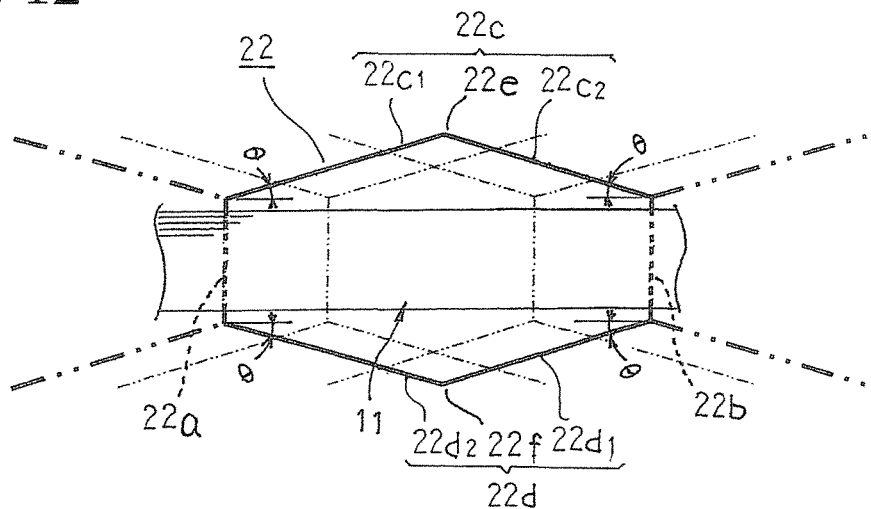
FIG. 12 is a developed projection that shows a state in which three winding bodies in the rotary electric machine according to Embodiment 1 of the present invention are mounted into identical slot groups of the stator core consecutively in a circumferential direction when viewed from radially outside.

FIG. 1 is a half section that shows a rotary electric machine according to Embodiment 1 of the present invention, FIG. 2 is an oblique projection that shows part of the rotary electric machine according to Embodiment 1 of the present invention, FIG. 3 is an oblique projection that shows a stator that is used in the rotary electric machine according to Embodiment 1 of the present invention, FIG. 4 is an oblique projection that shows a core block that constitutes a stator core that is used in the rotary electric machine according to Embodiment 1 of the present invention, FIG. 5 is an oblique projection that shows a winding assembly that constitutes a stator winding of the stator that is used in the rotary electric machine according to Embodiment 1 of the present invention, FIG. 6 is an oblique projection that shows a winding body that constitutes the winding assembly in the rotary electric machine according to Embodiment 1 of the present invention, FIG. 7 is a front elevation that shows the winding body that constitutes the winding assembly in the rotary electric machine according to Embodiment 1 of the present invention, FIG. 8 is a side elevation that shows the winding body that constitutes the winding assembly in the rotary electric machine according to Embodiment 1 of the present invention, FIG. 9 is an oblique projection of the winding body that constitutes the winding assembly in the rotary electric machine according to Embodiment 1 of the present invention when viewed from obliquely above a front surface, FIG. 10 is a partial end elevation of a state in which two winding bodies in the rotary electric machine according to Embodiment 1 of the present invention are mounted into the stator core so as to share a single slot when viewed from a side near a first axial end, FIG. 11 is a developed projection of a state in which three winding bodies in the rotary electric machine according to Embodiment 1 of the present invention are mounted into identical slot groups of the stator core consecutively in a circumferential direction when viewed from a side near a first axial end, and FIG. 12 is a developed projection that shows a state in which three winding bodies in the rotary electric machine according to Embodiment 1 of the present invention are mounted into identical slot groups of the stator core consecutively in a circumferential direction when viewed from radially outside. Moreover, for simplicity, coil ends are represented as straight lines in FIG. 11.

In FIGS. 1 and 2, a rotary electric machine 100 that functions as an electric machine includes: a housing 1 that has: a floored cylindrical frame 2; and an end plate 3 that closes an opening of the frame 2; a stator 10 that functions as an armature that is fixed to a cylindrical portion of the frame 2 in an internally fitted state; and a rotor 5 that is fixed to a rotating shaft 6 that is rotatably supported in the floor portion of the frame 2 and the end plate 3 by means of bearings 4 so as to be rotatably disposed on an inner circumferential side of the stator 10.

The rotor 5 is a permanent-magnet rotor that includes: a rotor core 7 that is fixed to the rotating shaft 6, which is inserted through a central position thereof; and permanent magnets 8 that are embedded near an outer circumferential surface of the rotor core 7 so as to be arranged at a set pitch circumferentially to constitute magnetic poles. Moreover, the rotor 5 is not limited to a permanent-magnet rotor, and a squirrel-cage rotor in which uninsulated rotor conductors are housed in slots of a rotor core such that two sides are shorted by a shorting ring, or a wound rotor in which insulated conductor wires are mounted into slots of a rotor core, etc., may be used.

Next, configuration of the stator 10 will be explained in detail with reference to FIGS. 3 through 9.

As shown in FIG. 3, the stator 10 includes: a stator core 11; and a stator winding 20 that functions as an armature winding 20 that is mounted onto the stator core 11. Here, to facilitate explanation, the number of poles in the rotor 5 is eight, the number of slots in the stator core 11 is forty-eight, and the stator winding 20 is a three-phase winding. In other words, the slots 13 are formed on the stator core 11 at a ratio of two slots per phase per pole. Moreover, the number of slots per phase per pole is two.

As shown in FIG. 4, core blocks 12 are made by dividing the annular stator core 11 into forty-eight equal sections circumferentially, and include: a core back portion 12a that has a circular arc-shaped cross section, that is produced by laminating and integrating a set number of electromagnetic steel sheets; and a tooth 12b that is disposed so as to extend radially inward from an inner circumferential wall surface of the core back portion 12a. The stator core 11 is configured into an annular shape by arranging and integrating forty-eight core blocks 12 circumferentially by butting together circumferential side surfaces of the core back portions 12a such that the teeth 12b are oriented radially inward. The slots 13, which are formed by circumferentially adjacent core blocks 12, are arranged at a uniform angular pitch circumferentially so as to be open on an inner circumferential side. The teeth 12b are formed so as to have a tapered shape in which a circumferential width becomes gradually narrower radially inward, and a cross section of the slots 13 is oblong. Here, a circumferential direction corresponds to a direction of arrangement of the slots 13.

As shown in FIG. 3, the stator winding 20 is configured by applying a connection process to the winding assembly 21 that is mounted onto the stator core 11. As shown in FIG. 5, the winding assembly 21 is configured by arranging winding bodies 22 that are housed in pairs of slots 13 that are positioned on two sides of six consecutive teeth 12b circumferentially at a pitch of one slot. Winding ends 22g (described below) each project axially outward, and are arranged on a radially inner side of the winding assembly 21 at a pitch of one slot circumferentially. Winding ends 22h (described below) each project axially outward in an identical direction to the winding ends 22g, and are arranged on a radially outer side of the winding assembly 21 at a pitch of one slot circumferentially.

As shown in FIGS. 6 through 9, the winding bodies 22 are hexagonal coils that are configured by winding conductor wire 25 that has an oblong cross section that is made of jointless continuous copper wire or aluminum wire that is insulated using an enamel resin, for example, for four turns helically into an approximate hexagon shape such that flat surfaces that are constituted by long sides of the oblong cross sections face each other, and such that a gap d that is approximately equal to a length of short sides of the oblong cross section is ensured between the facing flat surfaces in question.

The winding bodies 22 that are configured in this manner include: first and second rectilinear portions 22a and 22b that form two columns that are separated by an angular pitch of six slots in which four of each are arranged in a direction of short sides of the oblong cross sections so as to leave gaps din each of the columns; and first and second coil ends 22c and 22d that alternately link first longitudinal ends to each other and second longitudinal ends to each other between the columns of first and second rectilinear portions 22a and 22b. Moreover, an angular pitch of six slots is a pitch between slot centers of slots 13 on two sides of six consecutive teeth 12b.

The first coil ends 22c have: first top portions 22e at central portions between the columns of the first and second rectilinear portions 22a and 22b; inclined portions $22c_1$ that extend outward at a set inclination longitudinally outward relative to the first and second rectilinear portions 22a and 22b from first ends of first rectilinear portions 22a in a first column toward second rectilinear portions 22b in a second column and are connected to the first top portions 22e; and inclined portions $22c_2$ that extend longitudinally inward relative to the first and second rectilinear portions 22a and 22b from the first top portions 22e toward the second rectilinear portions 22b in the second column at a set inclination, and are connected to first ends of the second rectilinear portion 22b in the second column. The first top portions 22e have: inverted U-shaped bulging portions $22e_1$ that link together end portions of the inclined portions $22c_1$ and $22c_2$; and a crank portions $22e_2$ that are formed by bending a central portion of the bulging portion $22e_1$ into a crank shape, and that displace the inclined portions $22c_1$ and $22c_2$ by a distance d in the direction of arrangement of the first and second rectilinear portions 22a and 22b.

Similarly, the second coil ends 22d have: second top portions 22f at central portions between the columns of the first and second rectilinear portions 22a and 22b; inclined portions $22d_1$ that extend outward at a set inclination longitudinally outward relative to the first and second rectilinear portions 22a and 22b from second ends of second rectilinear portions 22b in the second column toward first rectilinear portions 22a in the first column and are connected to the second top portions 22f; and inclined portions $22d_2$ that extend longitudinally inward relative to the first and second rectilinear portions 22a and 22b from the second top portions 22f toward the first rectilinear portions 22a in the first column at a set inclination, and are connected to second ends of the first rectilinear portions 22a in the first column. The second top portions 22f have: inverted U-shaped bulging portions $22f_1$ that link together end portions of the inclined portions $22d_1$ and $22d_2$; and a crank portions $22f_2$ that are formed by bending a central portion of the bulging portion $22f_1$ into a crank shape, and that displace the inclined portions $22d_1$ and $22d_2$ by a distance d in the direction of arrangement of the first and second rectilinear portions 22a and 22b.

In winding bodies 22 that are configured in this manner, the first and second rectilinear portions 22a and 22b, and the first and second coil ends 22c and 22d, are each arranged in the direction of the short sides of the oblong cross sections of the conductor wire 25 at a pitch (2d) that is approximately twice the length of the short sides such that flat surfaces that are constituted by the long sides of the oblong cross sections of the conductor wire 25 face each other. The first rectilinear portions 22a and the second rectilinear portions 22b, which are connected by means of the first top portions 22e and the second top portions 22f, are offset in the direction of arrangement so as to leave a gap d. The winding bodies 22 also include: a winding end 22g that extends outward in the longitudinal direction from the second end of a first rectilinear portion 22a that is positioned at a first end in the direction of arrangement in the first column; and a winding end 22h that extends outward in the longitudinal direction from the second end of a second rectilinear portion 22b that is positioned at a second end in the direction of arrangement in the second column.

FIG. 10 shows a state in which two winding bodies 22 are respectively mounted into two consecutive pairs among pairs of slots 13 that span six consecutive teeth 12b, and FIGS. 11 and 12 show a state in which three winding bodies 22 are respectively mounted into two consecutive pairs among pairs of slots 13 that span six consecutive teeth 12b. Now, if focus is placed on a single winding body 22, a first coil end 22c that extends outward at the first axial end from a first rectilinear portion 22a in a first layer from a slot opening side of a first slot 13 extends toward a second slot 13 circumferentially at an angle of inclination θ, is shifted radially outward at a crank portion $22e_2$ of a first top portion 22e by a distance d, subsequently extends toward the second slot 13 circumferentially at a reverse angle of inclination θ, and is linked to a second rectilinear portion 22b in a second layer from the slot opening side of the second slot 13. Next, a second coil end 22d that extends outward at the second axial end from the second rectilinear portion 22b in the second layer from the slot opening side of the second slot 13 extends toward the first slot 13 circumferentially at an angle of inclination θ, is shifted radially outward at a crank portion $22f_2$ of a second top portion 22f by a distance d, subsequently extends toward the first slot 13 circumferentially at a reverse angle of inclination θ, and is linked to a first rectilinear portion 22a in a third layer from the slot opening side of the first slot 13. In addition, a circumferential spacing between the first and second rectilinear portions 22a and 22b of the winding body 22 widens gradually toward a radially outer side so as to conform to the slot shape of pairs of slots 13 that span six consecutive teeth 12b. Here, a radial direction corresponds to a slot depth direction.

In this manner, the first rectilinear portions 22a in the first, third, fifth, and seventh layers of the first slot 13 and the second rectilinear portions 22b in the second, fourth, sixth, and eight layers of the second slot 13 are each linked into a helical shape by the first and second coil ends 22c and 22d. The inclined portions $22c_1$, $22c_2$, $22d_1$, and $22d_2$ that extend from end portions of the first and second rectilinear portions 22a and 22b to the first and second top portions 22e and 22f are formed so as to have a circular arc shape when viewed from an axial direction. Curvature of the inclined portions $22c_1$, $22c_2$, $22d_1$, and $22d_2$ is greater in the inclined portions that are positioned on a radially outer side. In the slot 13 that the two winding bodies 22 share, the first and second rectilinear portions 22a and 22b of the two winding bodies 22 are housed such that the long sides of the oblong cross sections of the oblong conductor wires 25 are oriented circumferentially so as to line up alternately in a single column in the radial direction. As shown in FIG. 10, the first and second coil ends 22c and 22d are positioned radially further outward than tip ends of the teeth 12b of the stator core 11, and are positioned radially further inward than bottom portions of the slots 13.

Figure 13:
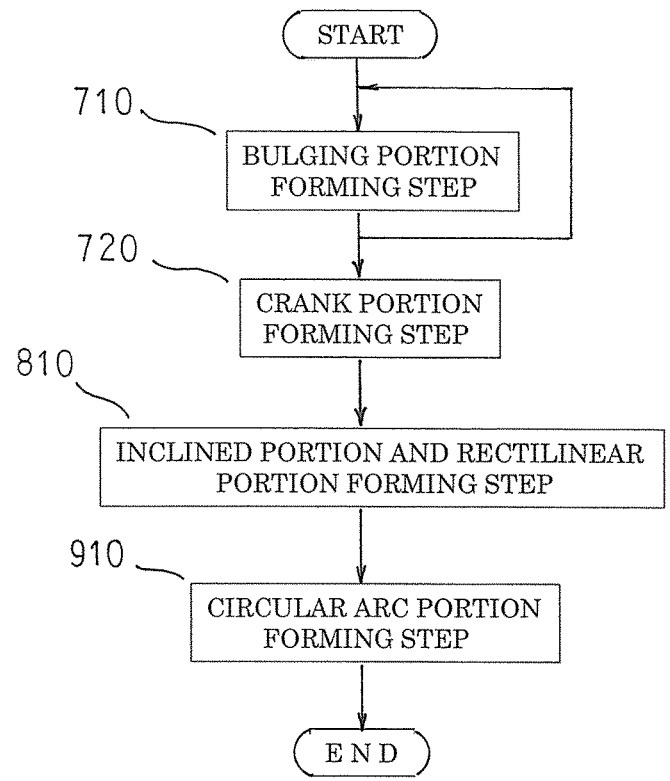
FIG. 13 is a diagram that explains flow of steps in manufacturing a winding body that is used in the stator winding according to Embodiment 1 of the present invention.
Figure 17:
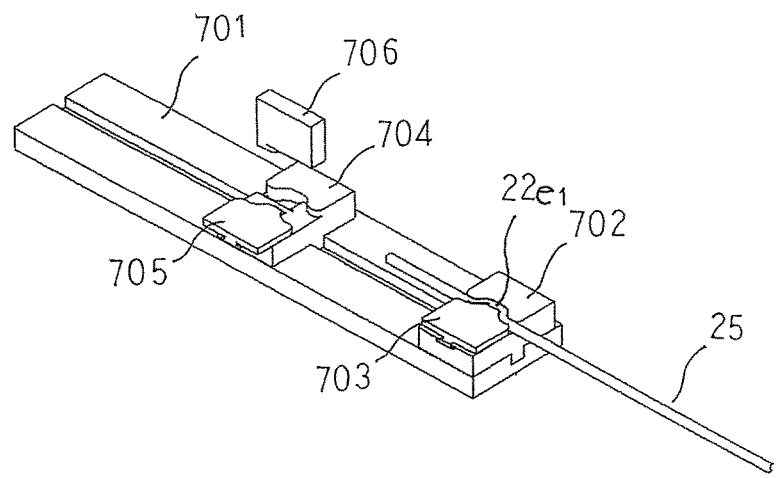
FIG. 17 is a diagram that explains the bulging portion forming step in the method for manufacturing a winding body that is used in the stator winding according to Embodiment 1 of the present invention.
Figure 18:
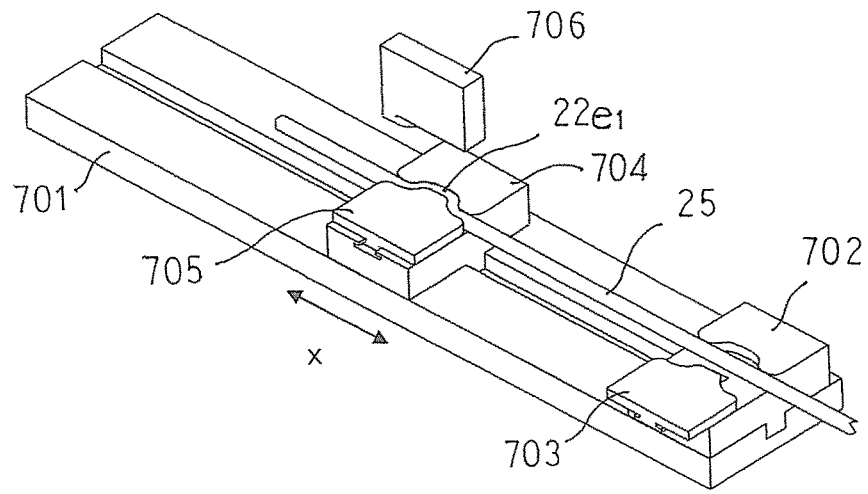
FIG. 18 is a diagram that explains the bulging portion forming step in the method for manufacturing a winding body that is used in the stator winding according to Embodiment 1 of the present invention.
Figure 19:
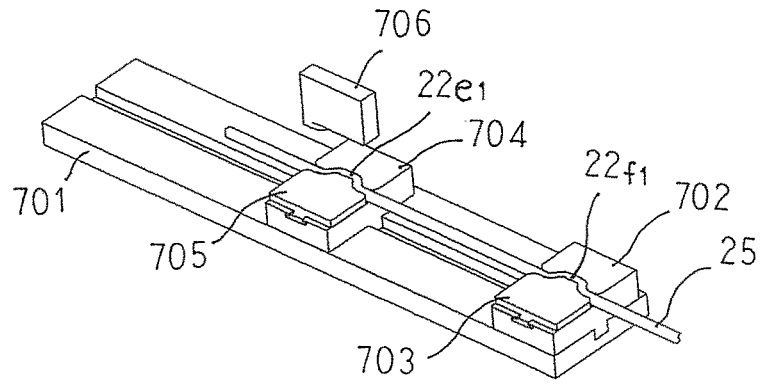
FIG. 19 is a diagram that explains the bulging portion forming step in the method for manufacturing a winding body that is used in the stator winding according to Embodiment 1 of the present invention.
Figure 20:
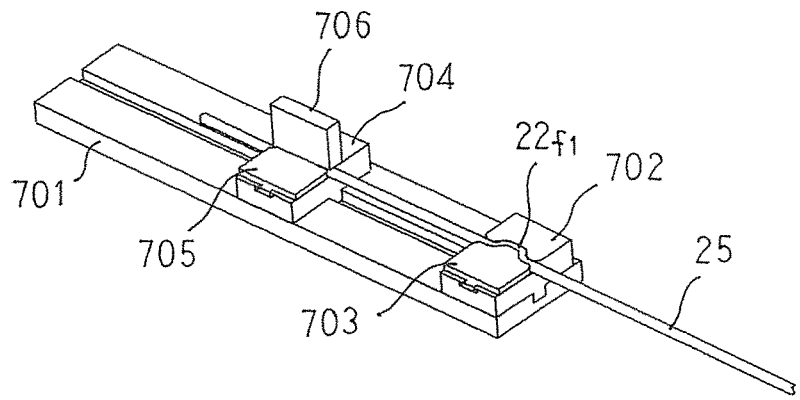
FIG. 20 is a diagram that explains a crank portion forming step in the method for manufacturing a winding body that is used in the stator winding according to Embodiment 1 of the present invention.
Figure 21:
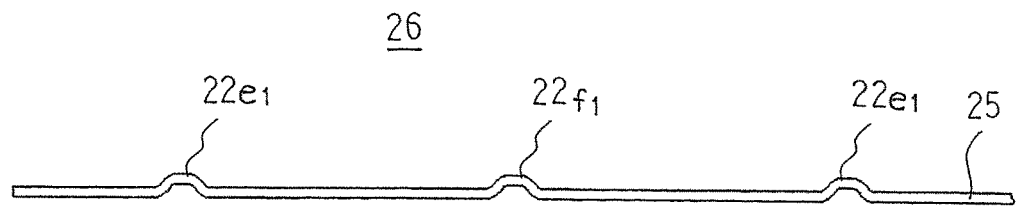
FIG. 21 is a front elevation that shows a conductor wire to which bending has been applied by the coil end forming machine in the method for manufacturing a winding body that is used in the stator winding according to Embodiment 1 of the present invention.
Figure 22:
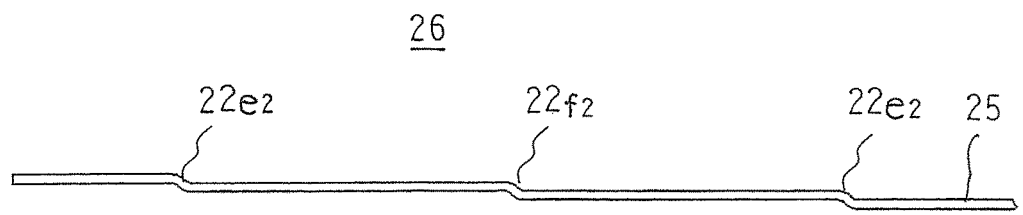
FIG. 22 is a plan that shows the conductor wire to which bending has been applied by the coil end forming machine in the method for manufacturing a winding body that is used in the stator winding according to Embodiment 1 of the present invention.
Figure 23:
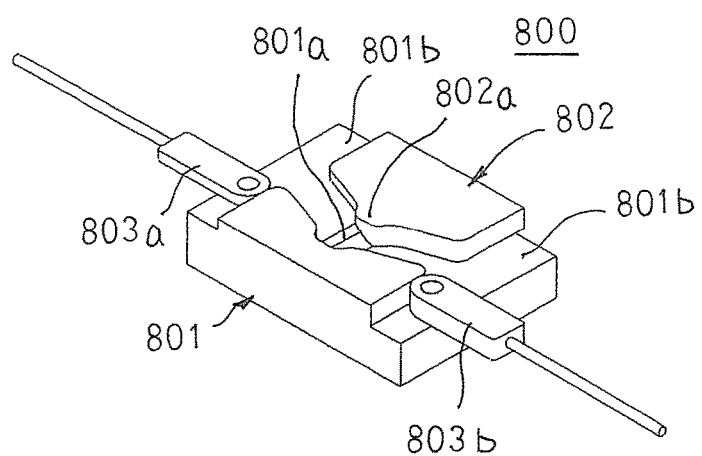
FIG. 23 is an oblique projection that shows an inclined portion and rectilinear portion forming machine in the method for manufacturing a winding body that is used in the stator winding according to Embodiment 1 of the present invention.
Figure 24:
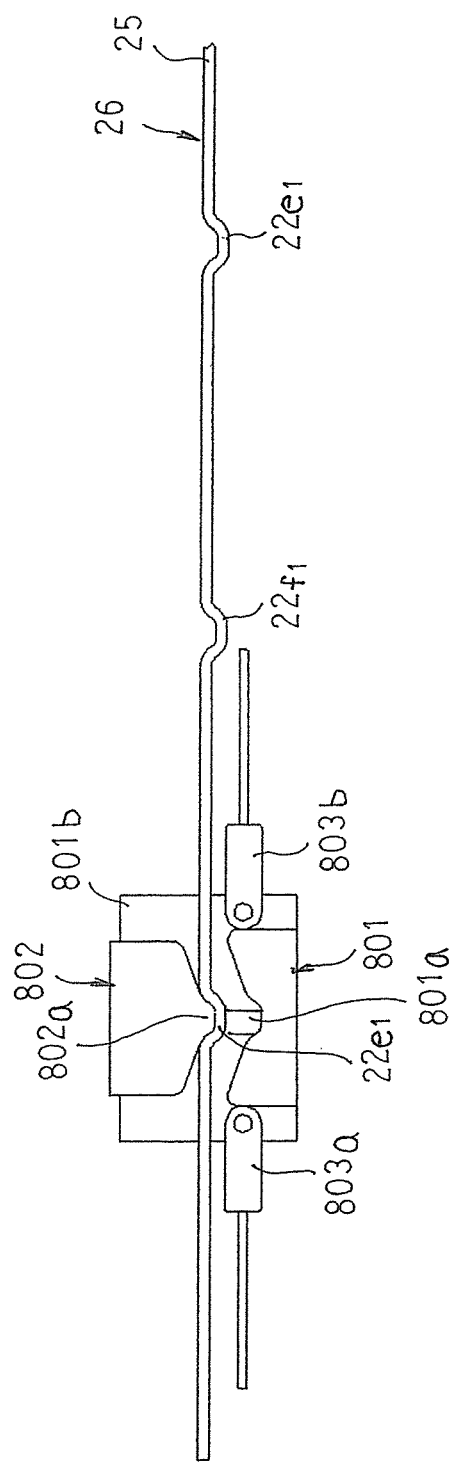
FIG. 24 is a process diagram that explains an inclined portion forming step in the method for manufacturing a winding body that is used in the stator winding according to Embodiment 1 of the present invention.
Figure 25:
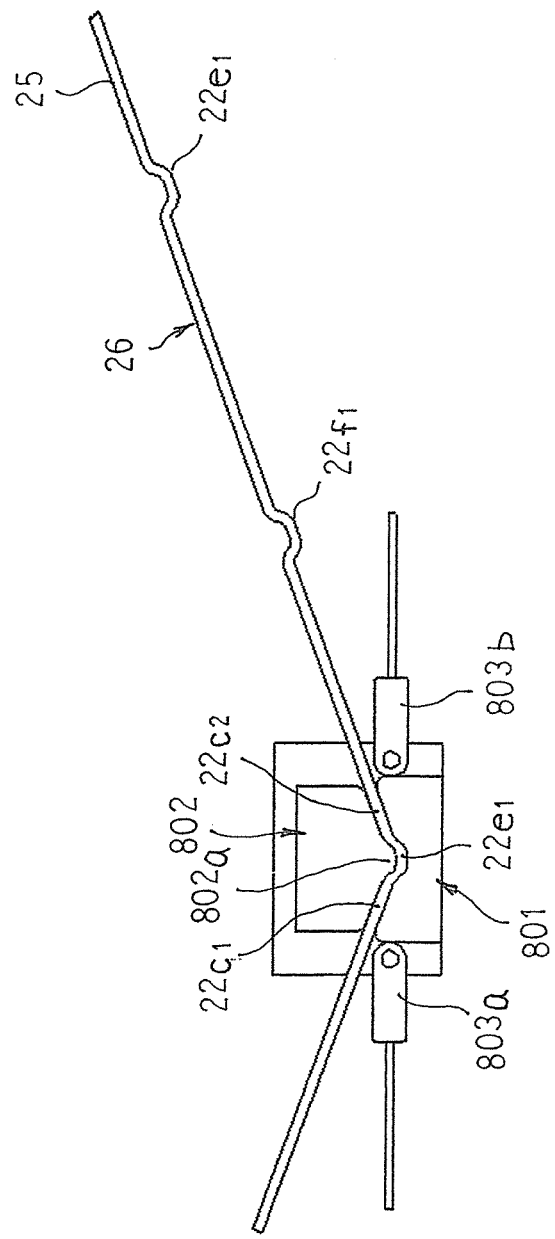
FIG. 25 is a process diagram that explains the inclined portion forming step in the method for manufacturing a winding body that is used in the stator winding according to Embodiment 1 of the present invention.
Figure 26:
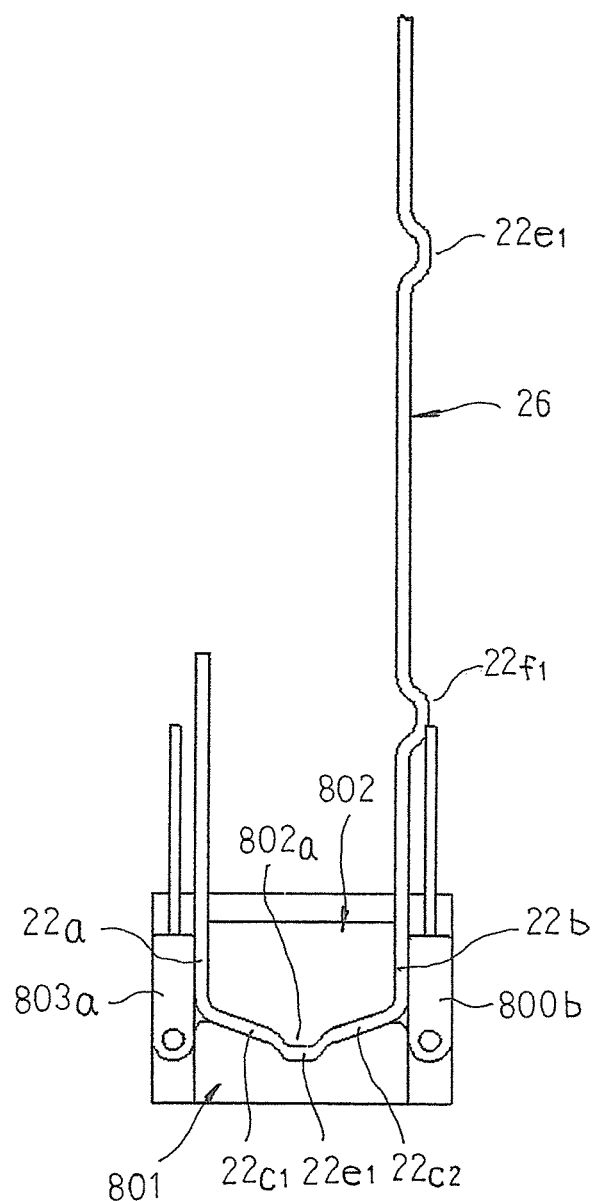
FIG. 26 is a process diagram that explains a rectilinear portion forming step in the method for manufacturing a winding body that is used in the stator winding according to Embodiment 1 of the present invention.
Figure 27:
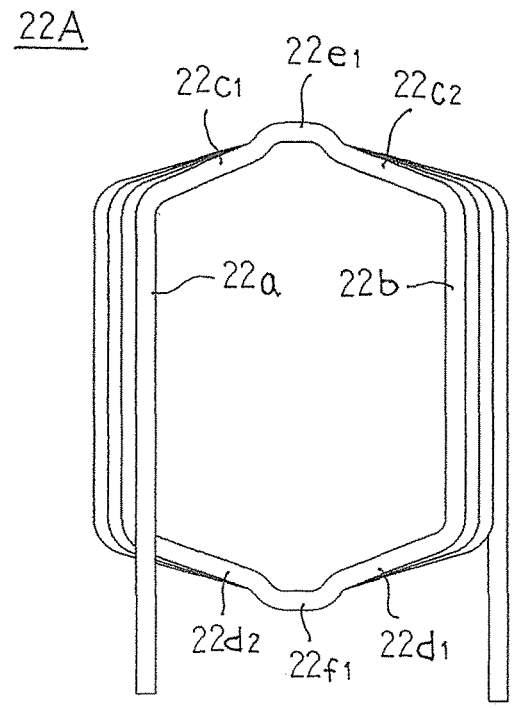
FIG. 27 is a front elevation that shows an intermediate winding body that is manufactured by the method for manufacturing a winding body that is used in the stator winding according to Embodiment 1 of the present invention.
Figure 28:
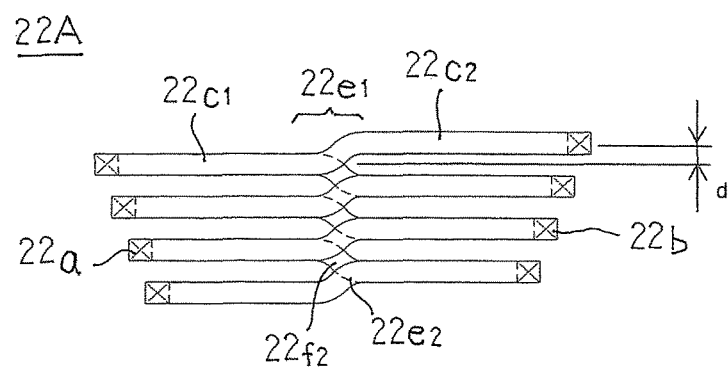
FIG. 28 is a top plan that shows the intermediate winding body that is manufactured by the method for manufacturing a winding body that is used in the stator winding according to Embodiment 1 of the present invention.
Figure 29:
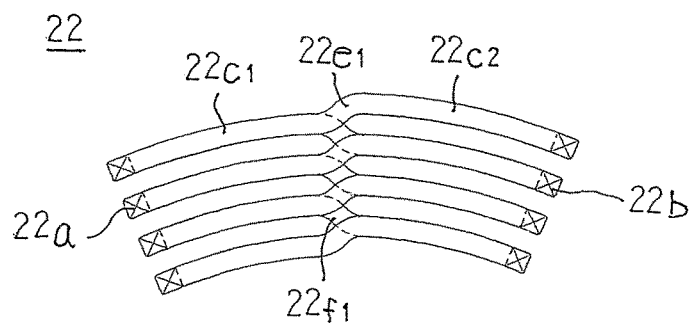
FIG. 29 is a top plan that shows a winding body that is manufactured by the method for manufacturing a winding body that is used in the stator winding according to Embodiment 1 of the present invention.
Figure 30:
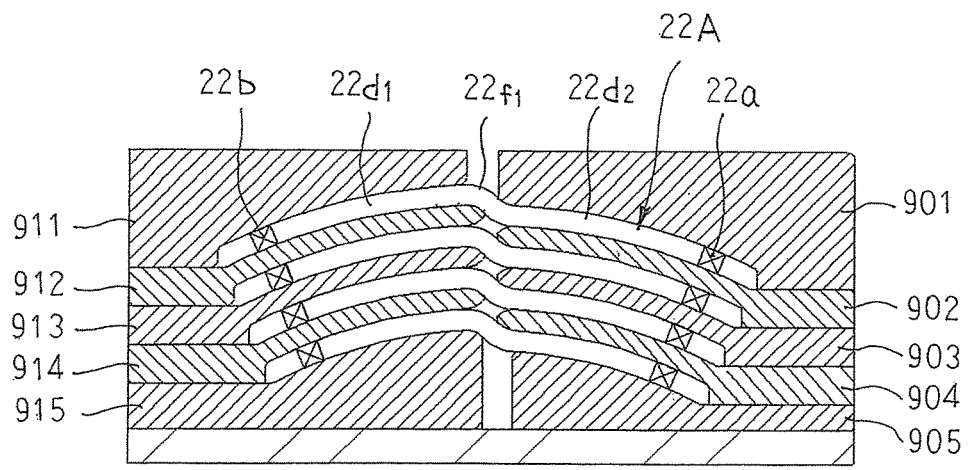
FIG. 30 is a diagram that explains an circular arc portion forming step in the method for manufacturing a winding body that is used in the stator winding according to Embodiment 1 of the present invention.

Next, a method for manufacturing of the winding bodies 22 will be explained with reference to FIGS. 13 through 21. FIG. 13 is a diagram that explains flow of steps in manufacturing a winding body that is used in the stator winding according to Embodiment 1 of the present invention, FIG. 14 is an oblique projection that explains a configuration of a coil end forming machine in a method for manufacturing a winding body that is used in the stator winding according to Embodiment 1 of the present invention, FIG. 15 is an oblique projection that shows a die of a coil end forming machine in the method for manufacturing a winding body that is used in the stator winding according to Embodiment 1 of the present invention, FIG. 16 is a diagram that explains a bulging portion forming step in the method for manufacturing a winding body that is used in the stator winding according to Embodiment 1 of the present invention, FIG. 17 is a diagram that explains the bulging portion forming step in the method for manufacturing a winding body that is used in the stator winding according to Embodiment 1 of the present invention, FIG. 18 is a diagram that explains the bulging portion forming step in the method for manufacturing a winding body that is used in the stator winding according to Embodiment 1 of the present invention, FIG. 19 is a diagram that explains the bulging portion forming step in the method for manufacturing a winding body that is used in the stator winding according to Embodiment 1 of the present invention, FIG. 20 is a diagram that explains a crank portion forming step in the method for manufacturing a winding body that is used in the stator winding according to Embodiment 1 of the present invention, FIG. 21 is a front elevation that shows a conductor wire to which bending has been applied by the coil end forming machine in the method for manufacturing a winding body that is used in the stator winding according to Embodiment 1 of the present invention, FIG. 22 is a plan that shows the conductor wire to which bending has been applied by the coil end forming machine in the method for manufacturing a winding body that is used in the stator winding according to Embodiment 1 of the present invention, FIG. 23 is an oblique projection that shows an inclined portion and rectilinear portion forming machine in the method for manufacturing a winding body that is used in the stator winding according to Embodiment 1 of the present invention, FIGS. 24 and 25 are process diagrams that explain an inclined portion forming step in the method for manufacturing a winding body that is used in the stator winding according to Embodiment 1 of the present invention, FIG. 26 is a process diagram that explains a rectilinear portion forming step in the method for manufacturing a winding body that is used in the stator winding according to Embodiment 1 of the present invention, FIG. 27 is a front elevation that shows an intermediate winding body that is manufactured by the method for manufacturing a winding body that is used in the stator winding according to Embodiment 1 of the present invention, FIG. 28 is a top plan that shows the intermediate winding body that is manufactured by the method for manufacturing a winding body that is used in the stator winding according to Embodiment 1 of the present invention, FIG. 29 is a top plan that shows a winding body that is manufactured by the method for manufacturing a winding body that is used in the stator winding according to Embodiment 1 of the present invention, and FIG. 30 is a diagram that explains a circular arc portion forming step in the method for manufacturing a winding body that is used in the stator winding according to Embodiment 1 of the present invention.

In this case, as shown in FIG. 13, the method for manufacturing the winding body 22 includes: a bulging portion forming step 710; a crank portion forming step 720; an inclined portion and rectilinear portion forming step 810; and a circular arc portion forming step 910.

Figure 14:
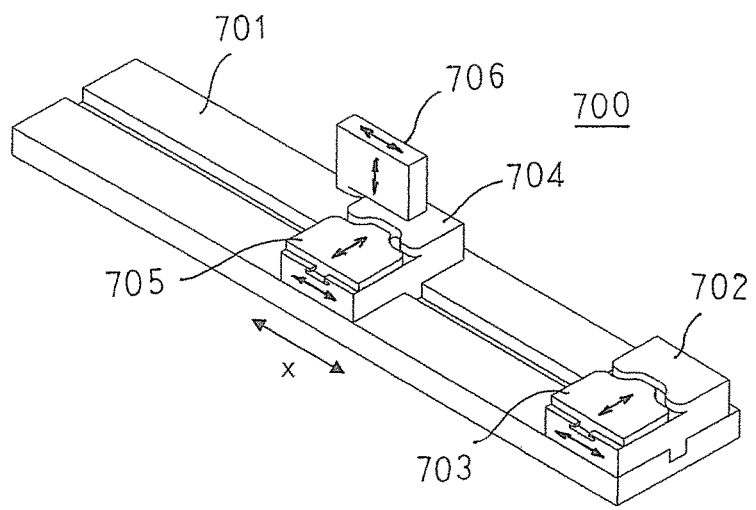
FIG. 14 is an oblique projection that explains a configuration of a coil end forming machine in a method for manufacturing a winding body that is used in the stator winding according to Embodiment 1 of the present invention.
Figure 15:
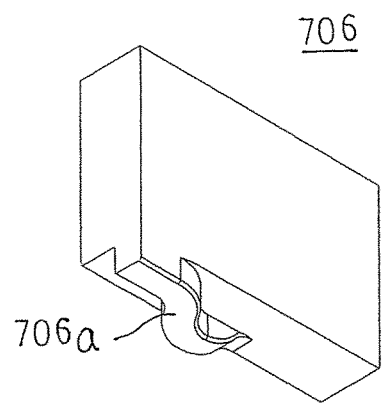
FIG. 15 is an oblique projection that shows a die of a coil end forming machine in the method for manufacturing a winding body that is used in the stator winding according to Embodiment 1 of the present invention.

As shown in FIG. 14, a coil end forming machine 700 that is used in the bulging portion forming step and the crank portion forming step includes: a fixed base 701; a bulging portion forming axial sliding die 702 that is installed on the fixed base 701 so as to be movable in an axial direction X of the conductor wire 25 that has an oblong cross section; a bulging portion forming perpendicular sliding die 703 that is installed on the bulging portion forming axial sliding die 702 so as to be movable in a direction that is perpendicular to the axial direction X a crank portion forming axial sliding clamper 704 that is installed on the fixed base 701 so as to be movable in the axial direction X of the conductor wire 25; a crank portion forming perpendicular sliding damper 705 that is installed on the crank portion forming axial sliding damper 704 so as to be movable in a direction that is perpendicular to the axial direction X and a crank portion forming die 706 that is disposed so as to be movable in the axial direction X and a vertical direction. As shown in FIG. 15, the crank portion forming die 706 has a coil forming portion 706a that matches the shapes of the crank portion forming axial sliding damper 704 and the crank portion forming perpendicular sliding clamper 705.

Figure 16:
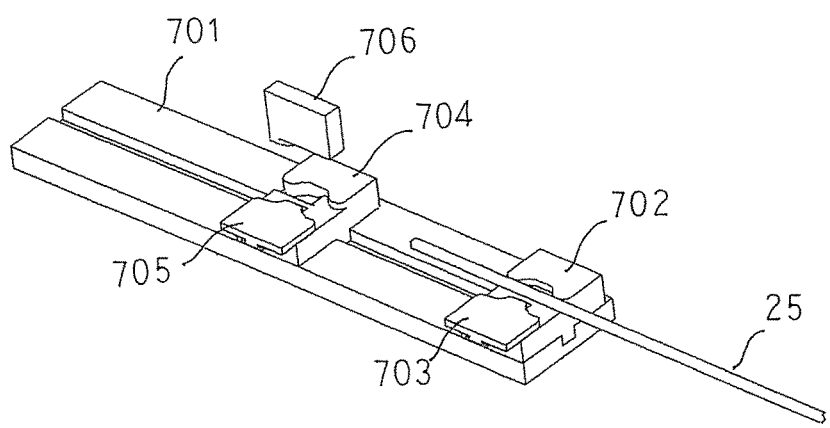
FIG. 16 is a diagram that explains a bulging portion forming step in the method for manufacturing a winding body that is used in the stator winding according to Embodiment 1 of the present invention.

First, in the bulging portion forming step 710, the conductor wire 25 is fed in the axial direction X by a set amount, and is disposed between the bulging portion forming axial sliding die 702 and the bulging portion forming perpendicular sliding die 703, as shown in FIG. 16. Next, the bulging portion forming perpendicular sliding die 703 is operated toward the bulging portion forming axial sliding die 702. As shown in FIG. 17, the conductor wire 25 is thereby clamped between the bulging portion forming axial sliding die 702 and the bulging portion forming perpendicular sliding die 703 to form an inverted U-shaped bulging portion $22e_1$.

Next, the bulging portion forming perpendicular sliding die 703 is operated away from the bulging portion forming axial sliding die 702, and the released conductor wire 25 is fed in the axial direction X by a set amount. Next, the crank portion forming perpendicular sliding clamper 705 is operated toward the crank portion forming axial sliding clamper 704, and the bulging portion $22e_1$ is held between the crank portion forming axial sliding clamper 704 and the crank portion forming perpendicular sliding clamper 705, as shown in FIG. 18. Next, the crank portion forming axial sliding clamper 704 is moved in the axial direction X to a position at which a spacing away from the bulging portion forming axial sliding die 702 is longer than a final forming target spacing by a set amount. The bulging portion $22e_1$ is positioned thereby.

Here, the stopping position of the crank portion forming axial sliding clamper 704 in the axial direction X is set so as to allow for an amount of shrinkage of the conductor wire 25 in the axial direction X due to formation of the bulging portions $22e_1$ and $22f_1$ and formation of the crank portions $22e_2$ and $22f_2$, in addition to lengths and circumferential spacings of the first and second rectilinear portions 22a and 22b and lengths of the first and second coil ends 22c and 22d in the winding body 22 that is the final formed body. In addition, the stopping position of the crank portion forming axial sliding clamper 704 in the axial direction X is controlled so as to be gradually further from the bulging portion forming axial sliding die 702 such that circumferential spacing of the first and second rectilinear portions 22a and 22b of the winding body 22 that is the final formed body gradually widens radially outward. Thus, the bulging portions $22e_1$ and $22f_1$ form reference points by which the pitch at which subsequent bulging portions $22e_1$ and $22f_1$ are formed by bending is managed.

Next, the bulging portion forming perpendicular sliding die 703 is operated toward the bulging portion forming axial sliding die 702 to form an inverted U-shaped bulging portion $22f_1$, as shown in FIG. 19.

Next, the crank portion forming die 706 is operated downward to apply bending to the bulging portions $22e_1$ by the coil forming portion 706a to form a crank portion $22e_2$ on the central portion of the bulging portion $22e_1$, as shown in FIG. 20 (the crank portion forming step 720). Next, the crank portion forming die 706 is operated upward, the crank portion forming perpendicular sliding clamper 705 is operated away from the crank portion forming axial sliding clamper 704, the bulging portion forming perpendicular sliding die 703 is operated away from the bulging portion forming axial sliding die 702, and the conductor wire 25 is released.

These steps are performed repeatedly to produce an intermediate conductor wire 26 in which bulging portions $22e_1$ on which crank portions $22e_2$ are formed and bulging portions $22f_1$ on which the crank portions $22f_2$ are formed are formed alternately at a set pitch in the axial direction X of the conductor wire 25, as shown in FIGS. 21 and 22.

Moreover, in the bulging portion forming step 710, only the bulging portion forming perpendicular sliding die 703 is operated to form the bulging portions $22e_1$ and $22f_1$, but the bulging portion forming axial sliding die 702 and the bulging portion forming perpendicular sliding die 703 may be operated to form the bulging portions $22e_1$ and $22f_1$.

In the crank portion forming step 720, only the crank portion forming perpendicular sliding clamper 705 is operated to fix the bulging portions $22e_1$ and $22f_1$, but the crank portion forming axial sliding clamper 704 and the crank portion forming perpendicular sliding clamper 705 may be operated to fix the bulging portions $22e_1$ and $22f_1$.

As shown in FIG. 23, an inclined portion and rectilinear portion forming machine 800 that is used in the inclined portion and rectilinear portion forming step 810 includes: a coil end forming fixed die 801 on which is formed a back surface portion 801b that is formed so as to have a stepped shape by means of a stepped portion 801a that corresponds to the crank portions $22e_2$ and $22f_2$; a coil end forming movable die 802 on which is formed a bulging portion 802a that positions the bulging portions $22e_1$ and $22f_1$; and bending portions 803a and 803b that are mounted to the coil end forming fixed die 801 so as to be pivotable around an axis that is perpendicular to the back surface portion 801b, and that form the first and second rectilinear portions 22a and 22b by bending.

In the inclined portion and rectilinear portion forming step 810, the conductor wire 25 is positioned by matching a bulging portion $22e_1$ of the conductor wire 25 to the bulging portion 802a of the coil end forming movable die 802, as shown in FIG. 24. Here, the bulging portion $22e_1$ of the conductor wire 25 is positioned at the stepped portion 801a such that portions on two sides of the bulging portion $22e_1$ of the conductor wire 25 are in contact with the back surface portion 801b. Next, the coil end forming movable die 802 is operated toward the coil end forming fixed die 801 to press the conductor wire 25 against the coil end forming fixed die 801, as shown in FIG. 25. The conductor wire 25 is thereby pressed and held between the coil end forming fixed die 801 and the coil end forming movable die 802, and the bulging portion $22e_1$ forms a reference point, and inclined portions $22c_1$ and $22c_2$ are formed by bending on two sides of the bulging portion $22e_1$.

Next, as shown in FIG. 26, the bending portions 803a and 803b are operated to bend the projecting portions of the conductor wire 25 that is pressed and held between the coil end forming fixed die 801 and the coil end forming movable die 802. This inclined portion and rectilinear portion forming step 810 is performed repeatedly to form inclined portions $22c_1$, $22c_2$, $22d_1$, and $22d_2$ and first and second rectilinear portions 22a and 22b on two sides of each of the bulging portions $22e_1$ and $22f_1$ to produce an intermediate winding body 22A.

This inclined portion and rectilinear portion forming step 810 is performed repeatedly to form inclined portions $22c_1$, $22c_2$, $22d_1$, and $22d_2$ and first and second rectilinear portions 22a and 22b on two sides of each of the bulging portions $22e_1$ and $22f_1$ to produce an intermediate winding body 22A.

As shown in FIGS. 27 and 28, the intermediate winding body 22A is produced in a similar manner to that of the winding body 22 except that the inclined portions $22c_1$, $22c_2$, $22d_1$, and $22d_2$ are formed so as to link the first and second rectilinear portions 22a and 22b and the bulging portions $22e_1$ and $22f_1$ rectilinearly.

Next, in the circular arc portion forming step 910, circular arc-shaped dies 902, 903, 904, 912, 913, and 914 are respectively inserted between the inclined portions $22d_1$ and $22d_1$, and between the inclined portions $22d_2$ and $22d_2$, of the second coil ends $22d$ of the intermediate winding body 22A that have a gap, as shown in FIG. 30. Next, the second coil ends $22d$ into which the dies 902, 903, 904, 912, 913, and 914 have been inserted are clamped between upper dies 901 and 911 and lower dies 902 and 912 to bend and form the inclined portions $22d_1$ and $22d_2$ into circular arc shapes. The inclined portions $22c_1$ and $22c_2$ of the first coil ends $22c$ of the intermediate winding body 22A that have a gap are similarly bent and formed into circular arc shapes. A winding body 22 is produced thereby, as shown in FIG. 29.

Thus, in the method for manufacturing a winding body 22 according to Embodiment 1, in the bulging portion forming step 710, the pitch at which subsequent bulging portions $22e_1$ and $22f_1$ are formed by bending is managed using bulging portions $22e_1$ and $22f_1$ that have previously been formed by bending as reference points. Thus, the lengths of the first and second rectilinear portions $22a$ and $22b$ of the winding body 22 and pitches between the columns of first and second rectilinear portions $22a$ and $22b$ can be modified easily by changing the pitch of formation of the bulging portions $22e_1$ and $22f_1$, enabling modifications to the axial length and diameter of the stator core 11 to be accommodated. In addition, modifications to the number of turns in the winding body 22 can also be accommodated easily by changing the number of bulging portions $22e_1$ and $22f_1$ formed.

Because the bulging portion forming step 710 and the crank portion forming step 720 are separated to form the first and second top portions $22e$ and $22f$ of the first and second coil ends $22c$ and $22d$, first and second top portions $22e$ and $22f$ that have complicated two-dimensional shapes can be bent and formed using a simple mechanism, enabling reductions in apparatus size and reductions in cost to be achieved.

Because the bulging portion forming step 710, the crank portion forming step 720, the inclined portion and rectilinear portion forming step 810, and the circular arc portion forming step 910 are separated, adjustment of takt time and production management are facilitated.

In the bulging portion forming step 710, because subsequent bulging portions $22e_1$ and $22f_1$ are formed by bending using bulging portions $22e_1$ and $22f_1$ that have previously been formed by bending as reference points, the bulging portions $22e_1$ and $22f_1$ can be formed accurately.

In the bulging portion forming step 710, bulging portions $22e_1$ and $22f_1$ that have been formed by bending are fed out by a set amount, and are clamped between the crank portion forming axial sliding clamper 704 and the crank portion forming perpendicular sliding clamper 705, the crank portion forming axial sliding clamper 704 is moved in the axial direction X, the crank portion forming axial sliding damper 704 is (the bulging portions $22e_1$ and $22f_1$ are) positioned at a set position, and then subsequent bulging portions $22e_1$ and $22f_1$ are formed by bending. Thus, because the bulging portions $22e_1$ and $22f_1$, which are reference points, are positioned at set positions rather than relying only on the amount of feeding of the conductor wire 25, the bulging portions $22e_1$ and $22f_1$ can be formed by bending with high precision.

In the inclined portion and rectilinear portion forming step 810, because the bulging portions $22e_1$ and $22f_1$ are used as reference points and the inclined portions $22c_1$, $22c_2$, $22d_1$, and $22d_2$ and the first and second rectilinear portions $22a$ and $22b$ on two sides of those bulging portions $22e_4$ and $22f_1$ are formed by bending, the inclined portions $22c_4$, $22c_2$, $22d_1$, and $22d_2$ and the first and second rectilinear portions $22a$ and $22b$ can be formed accurately by bending.

The inclined portions $22c_1$, $22c_2$, $22d_1$, and $22d_2$ of the intermediate winding body 22A that is manufactured using the inclined portion and rectilinear portion forming step 810 are bent and formed into a circular arc shape. In other words, because the circular arc portion forming step 910 in which high milling precision is required is the final step, a winding body 22 that has circular arc-shaped inclined portions $22c_4$, $22c_2$, $22d_1$, and $22d_2$ that have been bent to high precision can be produced.

Figure 35:
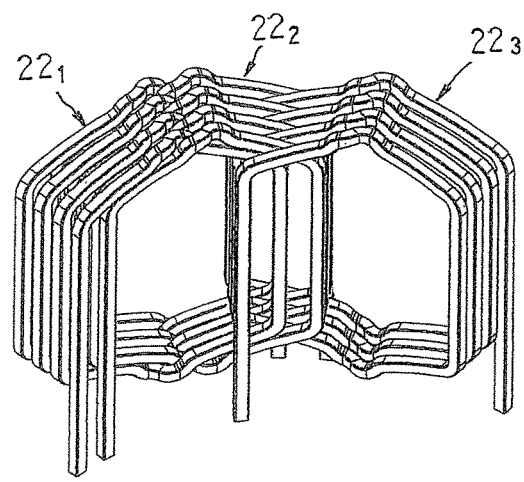
FIG. 35 is an oblique projection that explains the method for assembling a winding assembly in the rotary electric machine according to Embodiment 1 of the present invention.
Figure 36:
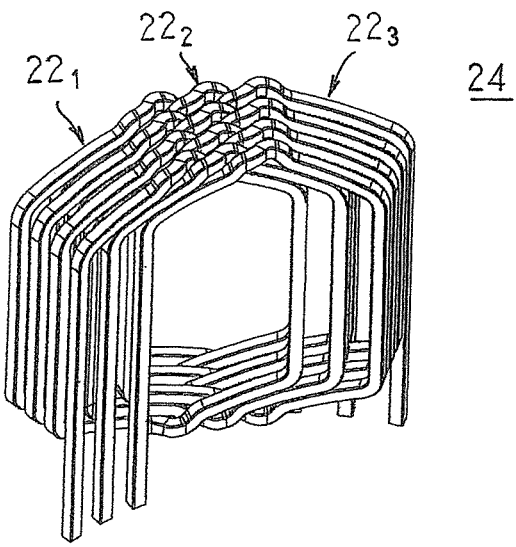
FIG. 36 is an oblique projection that explains the method for assembling a winding assembly in the rotary electric machine according to Embodiment 1 of the present invention.
Figure 37:
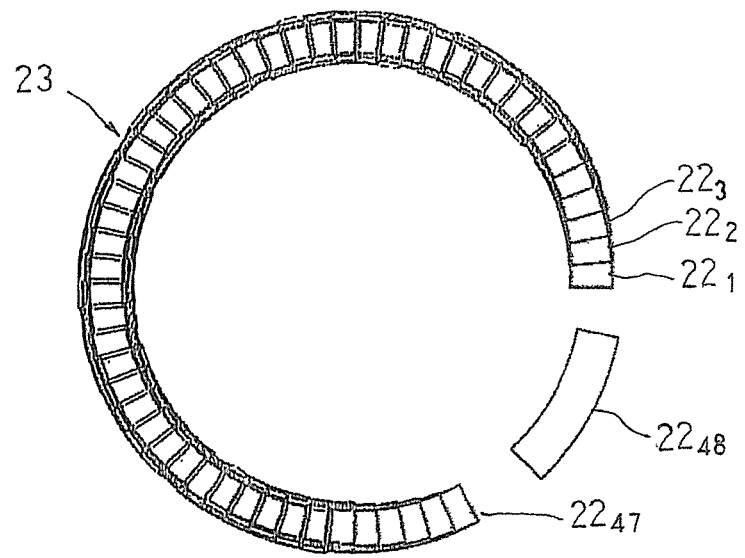
FIG. 37 is a schematic diagram that explains a procedure for installing a forty-eighth winding body in the method for assembling a winding assembly in the rotary electric machine according to Embodiment 1 of the present invention.
Figure 38:
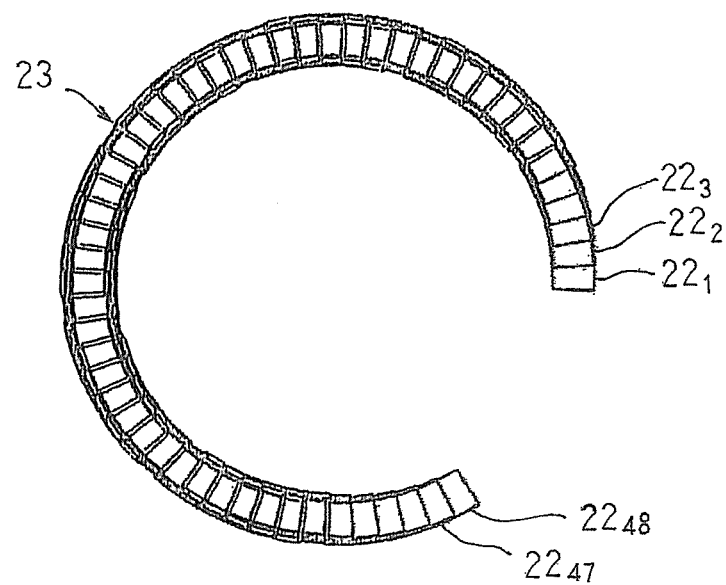
FIG. 38 is a schematic diagram that explains the procedure for installing the forty-eighth winding body in the method for assembling a winding assembly in the rotary electric machine according to Embodiment 1 of the present invention.
Figure 39:
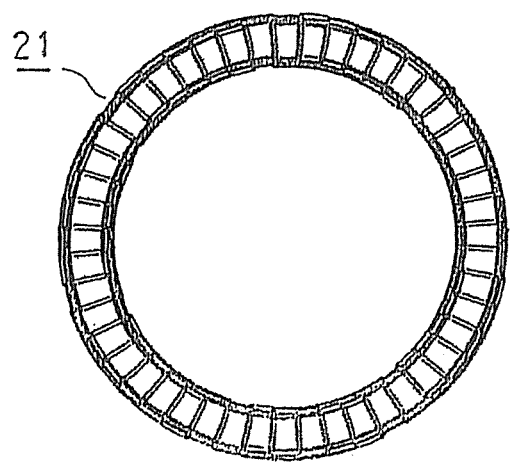
FIG. 39 is a schematic diagram that explains the procedure for installing the forty-eighth winding body in the method for assembling a winding assembly in the rotary electric machine according to Embodiment 1 of the present invention.

Next, a method for assembling the winding assembly 21 will be explained with reference to FIGS. 31 through 39. FIGS. 31 through 36 are oblique projections that explain a method for assembling the winding assembly in the rotary electric machine according to Embodiment 1 of the present invention, and FIGS. 37 through 39 are schematic diagrams that explain a procedure for installing a forty-eighth winding body in the method for assembling the winding assembly in the rotary electric machine according to Embodiment 1 of the present invention.

Here, to facilitate explanation, the winding bodies 22 are designated winding body $22_1$, winding body $22_2$, winding body $22_3$, winding body $22_{47}$, and winding body $22_{48}$ in order of mounting.

Figure 31:
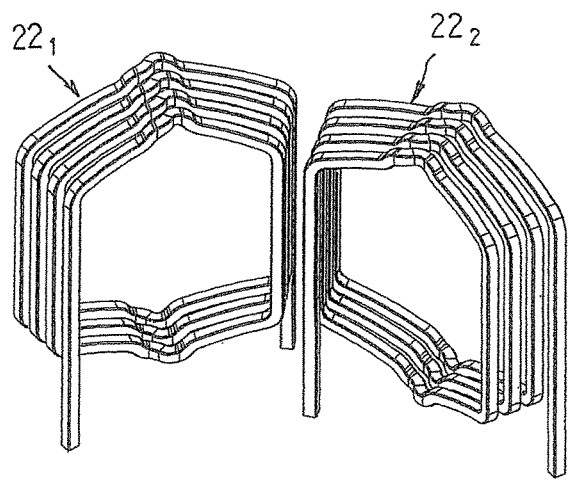
FIG. 31 is an oblique projection that explains a method for assembling a winding assembly in the rotary electric machine according to Embodiment 1 of the present invention.
Figure 32:
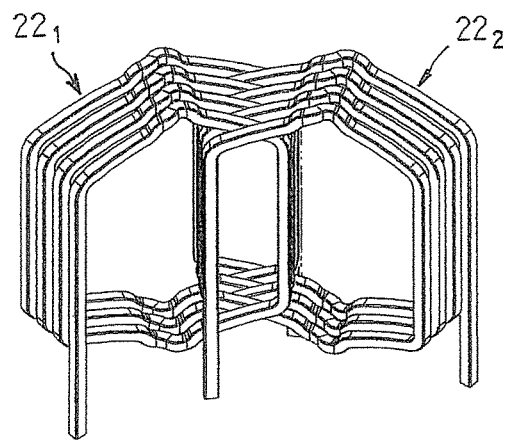
FIG. 32 is an oblique projection that explains the method for assembling a winding assembly in the rotary electric machine according to Embodiment 1 of the present invention.
Figure 33:
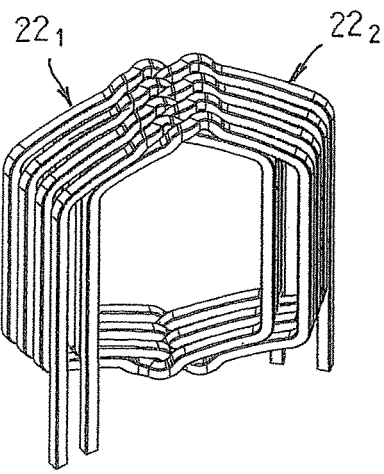
FIG. 33 is an oblique projection that explains the method for assembling a winding assembly in the rotary electric machine according to Embodiment 1 of the present invention.

As shown in FIG. 31, the first and second winding bodies $22_1$ and $22_2$ are placed circumferentially adjacent to each other so as to align axial height positions. Next, as shown in FIG. 32, the first rectilinear portions $22a$ of the second winding body $22_2$ are inserted between the second rectilinear portions $22b$ of the first winding body $22_1$, which have a gap d. Next, the second winding body $22_2$ is moved circumferentially until the first rectilinear portions $22a$ of the second winding body $22_2$ are at a position that is separated by a pitch of one slot (the angle between the slots) from the first rectilinear portions $22a$ of the first winding body $22_1$. The two winding bodies $22_1$ and $22_2$ are thereby assembled as shown in FIG. 33. In the assemblage of the two winding bodies $22_1$ and $22_2$, the conductor wire 25 of the winding body $22_2$ enters the gaps between the conductor wire 25 of the winding body $22_1$, overlapping with each other radially and increasing rigidity.

Figure 34:
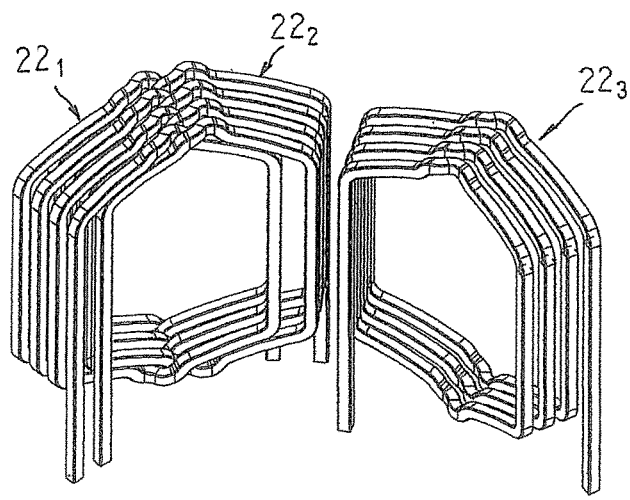
FIG. 34 is an oblique projection that explains the method for assembling a winding assembly in the rotary electric machine according to Embodiment 1 of the present invention.

Next, as shown in FIG. 34, the third winding body $22_3$ is placed circumferentially adjacent to the assemblage of the two winding bodies $22_1$ and $22_2$ so as to align axial height positions. Next, as shown in FIG. 35, the first rectilinear portions $22a$ of the third winding body $22_3$ are inserted between the second rectilinear portions $22b$ of the winding bodies $22_1$ and $22_2$. Next, the third winding body $22_3$ is moved circumferentially until the first rectilinear portions $22a$ of the third winding body $22_3$ are at a position that is separated by a pitch of one slot (the angle between the slots) from the first rectilinear portions $22a$ of the second winding body $22_2$. A sub-assembly 24 that is constituted by the three winding bodies $22_1$, $22_2$, and $22_3$ is thereby assembled as shown in FIG. 36.

Winding bodies 22 are additionally mounted sequentially by aligning axial height positions and moving them circumferentially until the forty-seventh winding body $22_{47}$. As shown in FIG. 37, the assemblage 23 in which the forty-seven winding bodies $22_1$ through $22_{47}$ are assembled is increased in diameter to form a C shape that is wider than a circumferential width of the forty-eighth winding body $22_{48}$ between the first winding body $22_1$ and the forty-seventh winding body $22_{47}$.

Next, as shown in FIG. 38, the forty-eighth winding body $22_{48}$ is mounted onto an end near the forty-seventh winding body $22_{47}$. In addition, as shown in FIG. 39, an opening of the C-shaped assemblage 23 is closed, and the first winding body $22_1$ and the forty-eighth winding body $22_{48}$ are fitted together, to assemble the annular winding assembly 21 that is shown in FIG. 5. In the winding assembly 21 that is assembled in this manner, forty-eight columns of eight first and second rectilinear portions 22a and 22b that are lined up in a single column radially are arranged circumferentially at a pitch of one slot.

Figure 40:
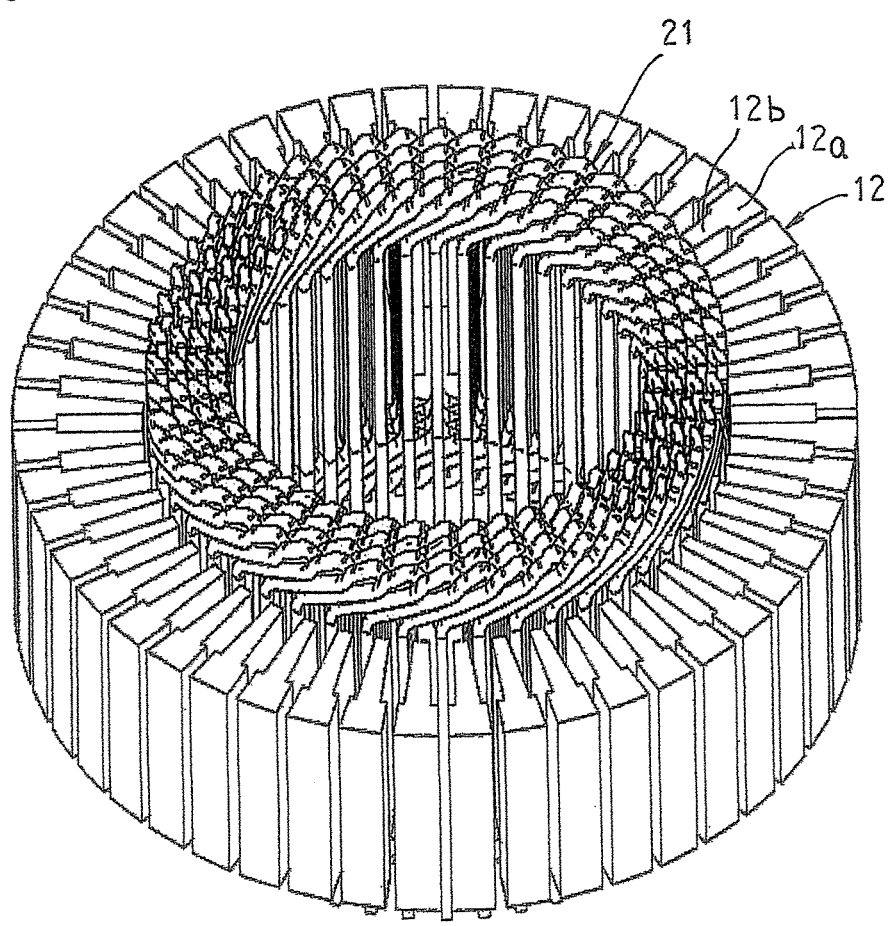
FIG. 40 is a diagram that explains a method for mounting a winding assembly into the stator core in the rotary electric machine according to Embodiment 1 of the present invention.
Figure 41:
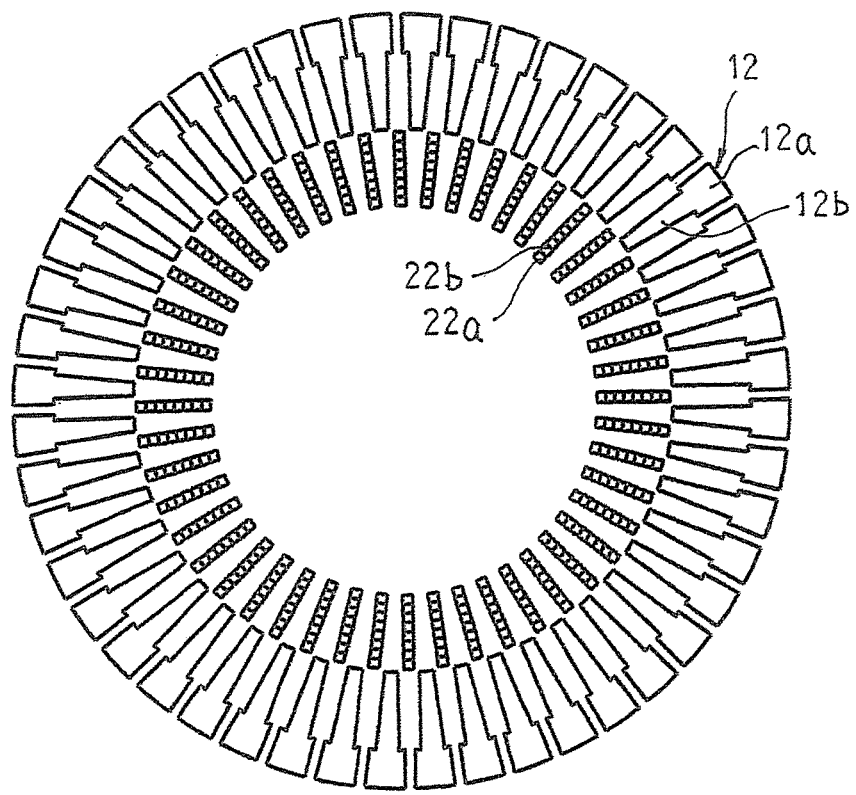
FIG. 41 is a diagram that explains the method for mounting the winding assembly into the stator core in the rotary electric machine according to Embodiment 1 of the present invention.
Figure 42:
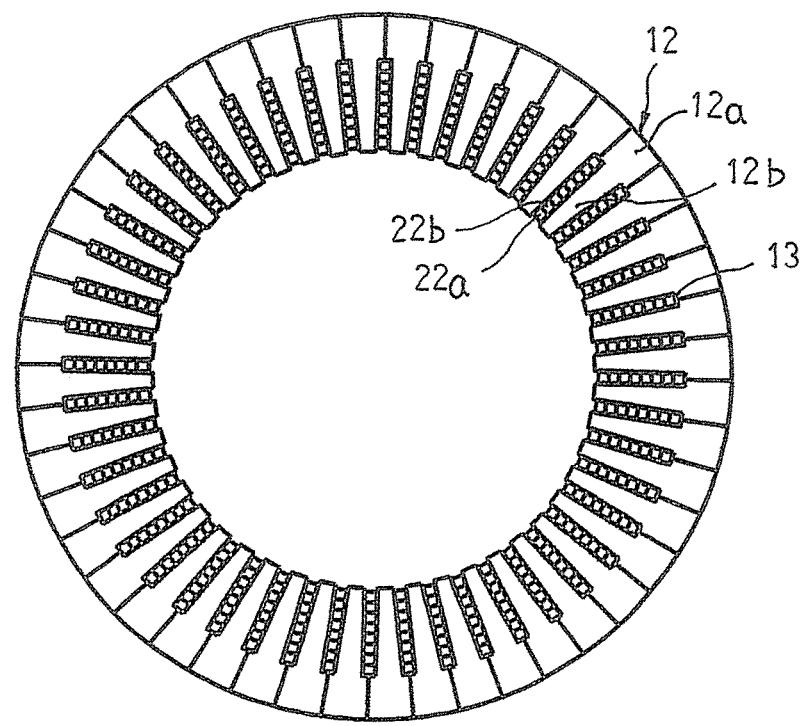
FIG. 42 is a diagram that explains the method for mounting the winding assembly into the stator core in the rotary electric machine according to Embodiment 1 of the present invention.
Figure 43:
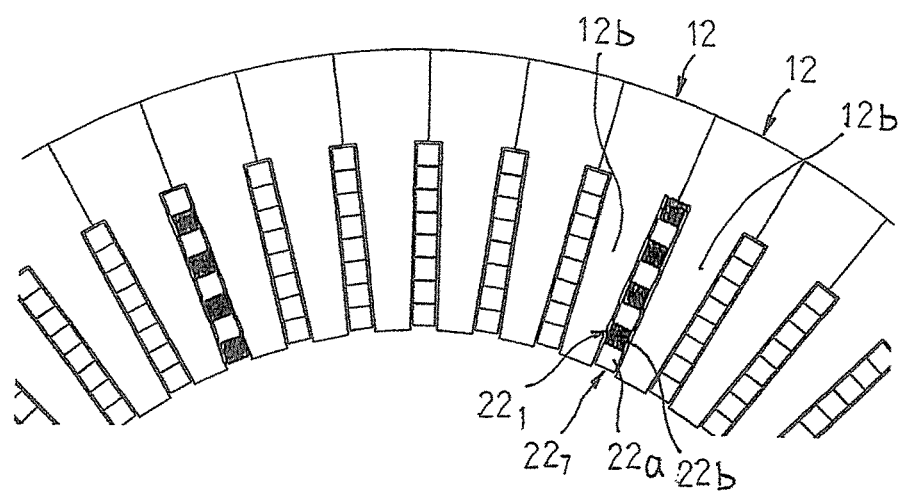
FIG. 43 is a diagram that explains the method for mounting the winding assembly into the stator core in the rotary electric machine according to Embodiment 1 of the present invention.

Next, a method for mounting the winding assembly 21 to the stator core 11 will be explained with reference to FIGS. 40 through 43. FIGS. 40 through 43 are diagrams that explain a method for mounting the winding assembly into the armature core in the rotary electric machine according to Embodiment 1 of the present invention, FIGS. 40 and 41 showing a state before the winding assembly is mounted, FIG. 42 showing a state after mounting of the winding assembly, and FIG. 43 showing the state after mounting of the winding assembly enlarged. Moreover, for simplicity, only the first and second rectilinear portions 22a and 22b of the winding assembly 21 are shown in FIGS. 41 through 43.

First, forty-eight core blocks 12 are arranged at an approximately uniform angular pitch circumferentially such that respective teeth are positioned on a radially outer side between adjacent columns of first and second rectilinear portions 22a and 22b of the winding assembly 21, as shown in FIGS. 40 and 41. Next, the core blocks 12 that are arranged circumferentially are simultaneously moved radially inward. The respective teeth 12b of the core blocks 12 are thereby inserted between the adjacent columns of first and second rectilinear portions 22a and 22b, and the circumferential side surfaces of the adjacent core blocks 12 are butted against each other, preventing radially inward movement of the core blocks 12, and the winding assembly 21 is thereby mounted to the stator core 11, as shown in FIGS. 42 and 43. Inside each of the slots 13, eight first and second rectilinear portions 22a and 22b are housed such that the long sides of the oblong cross sections are oriented circumferentially so as to line up neatly in a single column in a radial direction.

Thus, by moving the core blocks 12 that are arranged in a row circumferentially radially inward so as to be inserted into the winding assembly 21, the first and second rectilinear portions 22a and 22b that are lined up irregularly in the radial direction are arranged neatly in a column by movement that narrows the spacing between the teeth 12b of the adjacent core blocks 12. In addition, gaps between each of the first and second rectilinear portions 22a and 22b that are arranged neatly in a column in the radial direction are reduced and eliminated by the radially inward movement of the core back portions 12a of the core blocks 12. Thus, space factor of the conductor wires 25 inside the slots 13 can be improved. Because the conductor wires 25 inside the slots 13 and the core blocks 12 are in contact with each other, and heat transfer performance to the stator core 11 from the winding assembly 21, which constitutes a heat-generating body during passage of electric current, can be improved, temperature increases in the winding assembly 21 are suppressed, enabling increases in electrical resistance to be suppressed. Because the core blocks 12 are inserted such that the spacing between the adjacent teeth 12b becomes gradually narrower, sliding movement at contact surfaces between the stator winding 20 and the core blocks 12 is suppressed, enabling damage to insulating coatings of the conductor wires 25 to be prevented.

The crank portions $22e_2$ and $22f_2$ of the first and second top portions 22e and 22f are configured so as to be shifted in a radial direction so as to leave a gap d that is approximately equal to radial dimensions of the first and second rectilinear portions 22a and 22b. Thus, one winding body 22 can be mounted to another winding body 22 without interference by aligning the axial height positions and moving it toward the other winding body 22 circumferentially, enabling assembly of the winding assembly 21 to be improved.

In a step of inserting the teeth 12b of the core blocks 12 between the first and second rectilinear portions 22a and 22b from an outer circumferential side of the winding assembly 21, because tapered teeth 12b are inserted between each of the columns of first and second rectilinear portions 22a and 22b from radially outside and moved radially inward, the winding assembly 21 is mounted into the stator core 11 such that the first and second rectilinear portions 22a and 22b are arranged neatly into single columns.

A rotary electric machine 100 that uses the stator 10 that is configured in this manner operates as an eight-pole forty-eight-slot inner-rotor three-phase motor when set alternating-current power is supplied to the stator winding 20.

Moreover, in Embodiment 1 above, the columns of first rectilinear portions 22a and columns of second rectilinear portions 22b of the winding body 22 are explained as being separated by an angular pitch of six slots, but the pitch between the columns is not limited to an angular pitch of six slots. If the slots 13 are formed at a ratio of one slot per phase per pole, for example, a stator winding that has a distributed winding construction of full-pitch windings can be obtained if an inter-column pitch between the columns of first rectilinear portions 22a and columns of second rectilinear portions 22b is set to an angular pitch of three slots.

Embodiment 2

Figure 44:
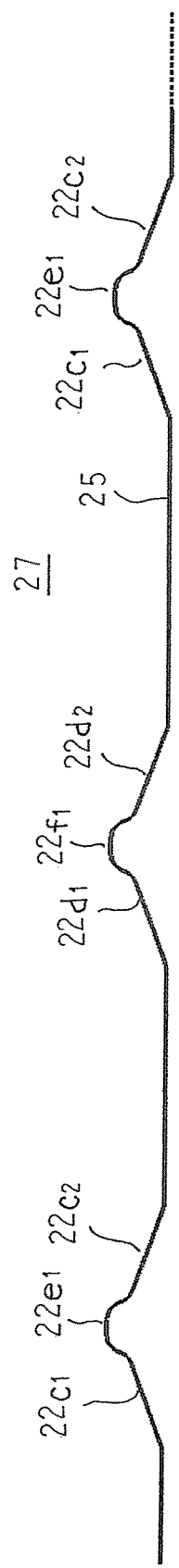
FIG. 44 is a front elevation that shows a conductor wire to which bending has been applied by a coil end forming machine in a method for manufacturing a winding body in the rotary electric machine according to Embodiment 2 of the present invention.

FIG. 44 is a front elevation that shows a conductor wire to which bending has been applied by a coil end forming machine in a method for manufacturing a winding body in the rotary electric machine according to Embodiment 2 of the present invention.

In Embodiment 2, shapes of a bulging portion forming axial sliding die 702 and a bulging portion forming perpendicular sliding die 703 in a coil end forming machine are modified, and bulging portions $22e_1$ and $22f_1$ and inclined portions $22c_1$, $22c_2$, $22d_1$, and $22d_2$ are formed simultaneously by bending. Thus, an inclined portion forming step is included in a bulging portion forming step to produce an intermediate conductor wire 27 in which bulging portions $22e_1$ and $22f_1$ and inclined portions $22c_1$, $22c_2$, $22d_1$, and $22d2$ are formed on a conductor wire 25 at a set pitch, as shown in FIG. 44.

According to Embodiment 2, because the inclined portions $22c_1$, $22c_2$, $22d_1$, and $22d_2$ are formed by bending simultaneously during the bending and forming of the bulging portions $22e_1$ and $22f_1$, the inclined portions $22c_1$, $22c_2$, $22d_1$, and $22d_2$ can be formed accurately.

Embodiment 3

Figure 45:
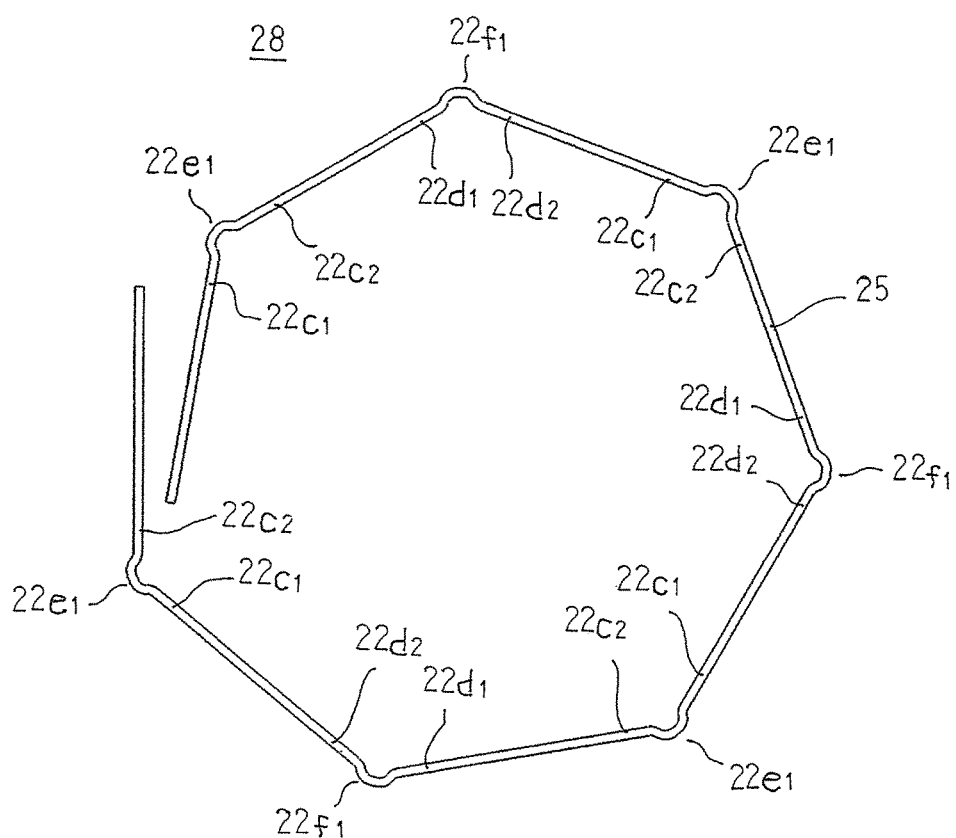
FIG. 45 is a front elevation that shows a conductor wire to which bending has been applied by a coil end forming machine in a method for manufacturing a winding body in the rotary electric machine according to Embodiment 3 of the present invention.

FIG. 45 is a front elevation that shows a conductor wire to which bending has been applied by a coil end forming machine in a method for manufacturing a winding body in the rotary electric machine according to Embodiment 3 of the present invention.

In Embodiment 3, shapes of a bulging portion forming axial sliding die 702 and a bulging portion forming perpendicular sliding die 703 in a coil end forming machine are modified, and bulging portions $22e_1$ and $22f_1$ and inclined portions $22c_1$, $22c_2$, $22d_1$, and $22d_2$ are formed simultaneously by bending. Thus, an inclined portion forming step is included in a bulging portion forming step to produce an intermediate conductor wire 28 in which bulging portions $22e_1$ and $22f_1$ and inclined portions $22c_1$, $22c_2$, $22d_1$, and $22d_2$ are formed on a conductor wire 25 at a set pitch, as shown in FIG. 45.

According to Embodiment 3, because the inclined portions $22c_1$, $22c_2$, $22d_1$, and $22d_2$ are formed by bending simultaneously during the bending and forming of the bulging portions $22e_1$ and $22f_1$, the inclined portions $22c_1$, $22c_2$, $22d_1$, and $22d_2$ can also be formed accurately.

Moreover, in each of the above embodiments, an eight-pole forty-eight-slot electric motor has been explained, but the number of poles and the number of slots are not limited to eight poles and forty-eight slots.

In each of the above embodiments, winding bodies are configured by winding conductor wire for four turns into a helical shape, but the number of turns of the conductor wire is not limited to four turns provided that it is greater than or equal to two turns.

In each of the above embodiments, winding bodies are produced using a conductor wire that has an oblong cross section, but winding bodies may be produced using conductor wire that has a circular cross section. In that case, bending of the conductor wire is facilitated.

In each of the above embodiments, a stator winding has been explained as an armature winding, but similar or identical effects are also exhibited if the present application is applied to a rotor winding.

In each of the above embodiments, cases in which the present application has been applied to an electric motor have been explained, but similar or identical effects are also exhibited if the present application is applied to a generator.

In each of the above embodiments, cases in which the present application has been applied to an electric motor have been explained, but the electric machines to which the present application can be applied are not limited to rotary electric machines such as electric motors or generators, and similar or identical effects are also exhibited if the present application is applied to a direct acting machine such as a linear motor. In that case, inclined portions of coil ends of winding bodies are not bent and formed into a circular arc shape, but are straight, and spacing between columns of first rectilinear portions and columns of second rectilinear portions is constant.

The invention claimed is:

1. A method for manufacturing a winding body that is used in an armature winding for an electric machine, said winding body being configured by winding a jointless continuous conductor wire that is coated with insulation into a helical shape for m turns, where m is a natural number that is greater than or equal to two, so as to comprise:
rectilinear portions that are arranged into two columns such that m of said rectilinear portions line up in each of said columns; and
coil ends that link together end portions of said rectilinear portions between said columns,
each of said coil ends comprising:
a bulging portion;
a pair of inclined portions that link said bulging portion and said rectilinear portions; and
a crank portion that is formed on a central portion of said bulging portion, and that displaces said rectilinear portions that are linked by said coil end by a set amount in a direction of arrangement of said rectilinear portions,
wherein said method for manufacturing a winding body that is used in an armature winding for an electric machine comprises:
a bulging portion forming step in which said bulging portions are formed by bending at a set pitch on said conductor wire;
a crank portion forming step in which said crank portions are formed by bending on said central portions of said bulging portions;
a rectilinear portion forming step in which said rectilinear portions are formed by bending on said conductor wire on which said bulging portions are formed at a set pitch and on which said crank portions are formed on each of said bulging portions after completion of said bulging portion forming step and said crank portion forming step; and
an inclined portion forming step in which said inclined portions are formed by bending on said conductor wire on two sides of said bulging portions before said rectilinear portion forming step.

2. The method for manufacturing a winding body that is used in an armature winding for an electric machine according to claim 1, wherein in said bulging portion forming step, a bulging portion that is formed by bending is used as a reference point to manage said pitch at which a subsequent bulging portion is formed by bending.

3. The method for manufacturing a winding body that is used in an armature winding for an electric machine according to claim 2, wherein before forming said subsequent bulging portion by bending, said bulging portion that constitutes said reference point is gripped and moved in a feed direction of said conductor wire to position said bulging portion that constitutes said reference point such that said pitch at which said subsequent bulging portion is formed by bending is said set pitch.

4. The method for manufacturing a winding body that is used in an armature winding for an electric machine according to claim 3, wherein after said bulging portion that constitutes said reference point is positioned, said crank portion forming step is implemented such that said crank portion is formed by bending on said central portion of said positioned bulging portion.

5. The method for manufacturing a winding body that is used in an armature winding for an electric machine according to claim 1, wherein in said rectilinear portion forming step, said rectilinear portions are formed by bending on said two sides of said bulging portion using said bulging portion as a reference point.

6. The method for manufacturing a winding body that is used in an armature winding for an electric machine according to claim 5, wherein before said rectilinear portions are formed by bending on said two sides of said bulging portion, said inclined portion forming step is implemented such that said inclined portions are formed by bending on said two sides of said bulging portion of said conductor wire using said bulging portion as said reference point.

7. The method for manufacturing a winding body that is used in an armature winding for an electric machine according to claim 1, wherein said bulging portion forming step includes said inclined portion forming step, and said bulging portion and said inclined portions on two sides of said bulging portion are formed by bending simultaneously at said set pitch on said conductor wire.

8. The method for manufacturing a winding body that is used in an armature winding for an electric machine according to claim 1, further comprising a step of bending and forming said inclined portions into a circular arc shape after completion of said rectilinear portion forming step.

* * * * *